(12) United States Patent
Kranich et al.

(10) Patent No.: US 6,651,163 B1
(45) Date of Patent: Nov. 18, 2003

(54) EXCEPTION HANDLING WITH REDUCED OVERHEAD IN A MULTITHREADED MULTIPROCESSING SYSTEM

(75) Inventors: Uwe Kranich, Kirchheim (DE); David S. Christie, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/521,248

(22) Filed: Mar. 8, 2000

(51) Int. Cl.$^7$ ................................................. G06F 9/00
(52) U.S. Cl. ........................ 712/244; 712/220; 712/228
(58) Field of Search ........................... 714/11; 712/244, 712/228, 220

(56) References Cited

U.S. PATENT DOCUMENTS

| | | | |
|---|---|---|---|
| 5,305,455 A | | 4/1994 | Anschuetz et al. |
| 5,481,719 A | * | 1/1996 | Ackerman et al. .......... 709/108 |
| 5,515,538 A | * | 5/1996 | Kleiman ..................... 710/260 |
| 5,715,458 A | * | 2/1998 | Holder et al. ............... 709/319 |
| 6,282,601 B1 | * | 8/2001 | Goodman et al. .......... 710/260 |

* cited by examiner

Primary Examiner—Eddie Chan
Assistant Examiner—Charles Harkness
(74) Attorney, Agent, or Firm—Meyertons Hood Kivlin Kowert & Goetzel, P.C.; B. Noël Kivlin; Rory D. Rankin

(57) ABSTRACT

A mechanism for exception and interrupt handling in multithreaded multiprocessors is provided. The mechanism allows the handling of exceptions and interruptions in a multithreaded multiprocessor computer, while hiding the multiprocessor nature of the computer from the operating system. Generally, when an operating system is cognizant of the multiprocessor nature of a computer, additional overhead may be required when handling exceptions and interruptions. Due to the overhead involved in saving and restoring processing states, the performance of a processor may be significantly impacted. Additional circuitry is provided which allows the multiprocessor nature of the computer to be hidden from the operating system, while minimizing the overhead necessary for proper handling.

14 Claims, 15 Drawing Sheets

| Time 1200 | Event 1202 | Current Processor 1204 | Processor 1206 | Process 1208 | REG1 1220 | EXT1 1222 | REG2 1230 | EXT2 1232 | GenExcProc 1234 | Proc1 1236 | Proc2 1238 |
|---|---|---|---|---|---|---|---|---|---|---|---|
| 0 | (Task 1 executing) |   | Proc1 | Thread1A |   |   |   |   |   |   |   |
|   |   | X | Proc2 | Thread1B |   |   |   |   |   |   |   |
| 1 | Switch to Task2 |   |   |   | Proc2 Thread1B State | Proc1 Thread1A State |   |   | 2 | 2 | 1 |
| 2 |   |   | Proc1 | Thread2A |   |   |   |   |   | 1 | 2 |
|   |   | X | Proc2 | Thread2B |   |   |   |   |   |   |   |
| 3 | Proc2 Exception |   |   |   |   |   | Proc2 Thread2B State | Proc1 Thread2A State | 2 | 2 | 1 |
| 4 |   |   | Proc1 |   |   |   |   |   |   |   |   |
|   |   | X | Proc2 | Handler |   |   |   |   |   |   |   |
| 5 | Switch to Task1 |   |   |   |   |   |   |   |   |   |   |
| 6 |   |   | Proc1 | Thread1B |   |   |   |   |   | 2 | 1 |
|   |   | X | Proc2 | Thread1A |   |   |   |   | 2 |   |   |

State Save Area 1250 (REG1, EXT1, REG2, EXT2)
Mapping Table 1502 (GenExcProc, Proc1, Proc2)

| Thread 1 Code | Thread 2 Code |
|---|---|
| L1: | mov reg1, Handle |
| Sync | Sync |
| RdFrProc 2, reg0, reg1 | Sync |
| Sync | |
| cmp reg0, Handle | |
| jnz L1 | |

Fig. 5

```
WHILE (1)
{
    SWITCH (FSMState)
    {
        CASE: WAIT_ALL_S1
            SSI=0;
            IF (all SSO == S1)
                FSMState = ALL_S1;
            ELSE
                FSMState = WAIT_ALL_S1;

CASE: ALL_S1
            FSMState = WAIT_ALL_S2;

CASE: WAIT_ALL_S2
            SSI = 1;
            IF (all SSO == S2)
                FSMState = ALL_S2;
            ELSE
                FSMState = WAIT_ALL_S2;

CASE: ALL_S2
            FSMState = WAIT_ALL_S1;
    }
}
```

| Time 1200 | Event 1202 | Current Processor 1204 | Processor 1206 | Process 1208 | REG1 1220 | EXT1 1222 | REG2 1230 | EXT2 1232 |
|---|---|---|---|---|---|---|---|---|
| 0 |  | X | Proc1 | Thread1A |  |  |  |  |
|  |  |  | Proc2 | Thread1B |  |  |  |  |
| 1 | Switch to Task2 |  |  |  | Proc1 Thread1A State | Proc2 Thread1B State |  |  |
| 2 |  | X | Proc1 | Thread2A | Proc1 Thread1A State | Proc2 Thread1B State |  |  |
|  |  |  | Proc2 | Thread2B |  |  |  |  |
| 3 | Proc2 Exception |  |  |  |  |  | Proc1 Thread2A State | Proc2 Thread2B State |
| 4 |  |  | Proc1 |  |  |  | Proc1 Thread2A State | Proc2 Thread2B State |
|  |  | X | Proc2 | Handler |  |  |  |  |
| 5 | Switch to Task1 |  |  |  |  |  |  |  |
| 6 |  |  | Proc1 | Thread1B |  |  |  |  |
|  |  | X | Proc2 | Thread1A |  |  |  |  |

State Save Area 1250 comprises REG1 1220, EXT1 1222, REG2 1230, EXT2 1232.

| Time 1200 | Event 1202 | Current Processor 1204 | Processor 1206 | Process 1208 | State Save Area 1250 ||||| Mapping Table 1502 ||
|---|---|---|---|---|---|---|---|---|---|---|---|
| | | | | | REG1 1220 | EXT1 1222 | REG2 1230 | EXT2 1232 | GenExcProc 1234 | Proc1 1236 | Proc2 1238 |
| 0 | (Task 1 executing) | | Proc1 | Thread1A | | | | | | | |
| | | X | Proc2 | Thread1B | | | | | | | |
| 1 | Switch to Task2 | | | | Proc2 Thread1B State | Proc1 Thread1A State | | | 2 | 2 | 1 |
| 2 | | | Proc1 | Thread2A | | | | | | 1 | 2 |
| | | X | Proc2 | Thread2B | | | | | | | |
| 3 | Proc2 Exception | | | | | | Proc2 Thread2B State | Proc1 Thread2A State | 2 | 2 | 1 |
| 4 | | | Proc1 | Handler | | | | | | | |
| | | X | | | | | | | | | |
| 5 | Switch to Task1 | | | | | | | | | | |
| | | | Proc1 | Thread1B | | | | | | | |
| 6 | | X | Proc2 | Thread1A | | | | | 2 | 2 | 1 |

Fig. 14

EXCEPTION HANDLING WITH REDUCED OVERHEAD IN A MULTITHREADED MULTIPROCESSING SYSTEM

BACKGROUND OF THE INVENTION

1. Field of the Invention

This invention is related to the field of microprocessors and, more particularly, to exception handling in multi-threaded multiprocessors.

2. Description of the Related Art

Computer systems employing multiple processing units hold a promise of economically accommodating performance capabilities that surpass those of current single-processor based systems. Within a multiprocessing environment, rather than concentrating all the processing for an application in a single processor, tasks are divided into groups or "threads" that can be handled by separate processors. The overall processing load is thereby distributed among several processors, and the distributed tasks may be executed simultaneously in parallel. The operating system software divides various portions of the program code into the separately executable threads, and typically assigns a priority level to each thread.

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

An important feature of microprocessors is the degree to which they can take advantage of parallelism. Parallelism is the execution of instructions in parallel, rather than serially. Superscalar processors are able to identify and utilize fine grained instruction level parallelism by executing certain instructions in parallel. However, this type of parallelism is limited by data dependencies between instructions. Further, as mentioned above, computer systems which contain more than one processor may improve performance by dividing the workload presented by the computer processes. By identifying higher levels of parallelism, multi-processor computer systems may execute larger segments of code, or threads, in parallel on separate processors. Because microprocessors and operating systems cannot identify these segments of code which are amenable to parallel multi-threaded execution, they are identified by the application code itself. Generally, the operating system is responsible for scheduling the various threads of execution among the available processors in a multi-processor system.

Another important feature of microprocessors is the manner in which they handle exceptions and interruptions. Due to the overhead involved in saving and restoring processing states, the performance of a processor may be significantly impacted when dealing with exception or interruptions. In a multiprocessor computer, it may be desirable to hide the multiprocessor nature of the computer from the operating system in order to eliminate further overhead. However, hiding the nature of the system may itself result in additional overhead or incorrect operation.

SUMMARY OF THE INVENTION

The problems outlined above are in large part solved by a microprocessor and method as described herein. Additional circuitry is included which enables the handling of exceptions and interruptions in a multithreaded multiprocessor without revealing the multiprocessor nature of the computer to the operating system. Advantageously, additional overhead may be avoided and correct-handling of exceptions and interruptions may be attained.

Broadly speaking, a method of performing exception handling in a multiprocessor computer is contemplated. A first processor saves its state as a regular state and a second processor saves its state as a first extended state, in response to an exception of the first processor. In addition, control information is saved which includes an indication of which processor generated the exception. Finally, the exception is handled by the first processor.

In addition, a multiprocessor computer comprising a plurality of processors is contemplated. Included in the multiprocessor computer is circuitry to support multi-threaded multiprocessing and a mapping table which is coupled to the processors. The mapping table includes exception handling circuitry which supports multithreaded multiprocessor exception handling.

BRIEF DESCRIPTION OF THE DRAWINGS

Other objects and advantages of the invention will become apparent upon reading the following detailed description and upon reference to the accompanying drawings in which:

FIG. 5 is a chart showing two threads of instructions and the use of a Sync instruction.

FIG. 8 shows an instruction sequence representing an asynchronous implementation of synchronization logic.

FIG. 11 is a chart showing an erroneous result which may occur when using static processor numbering.

FIG. 14 is a chart showing proper handling using a dynamic numbering scheme.

Figure 1:
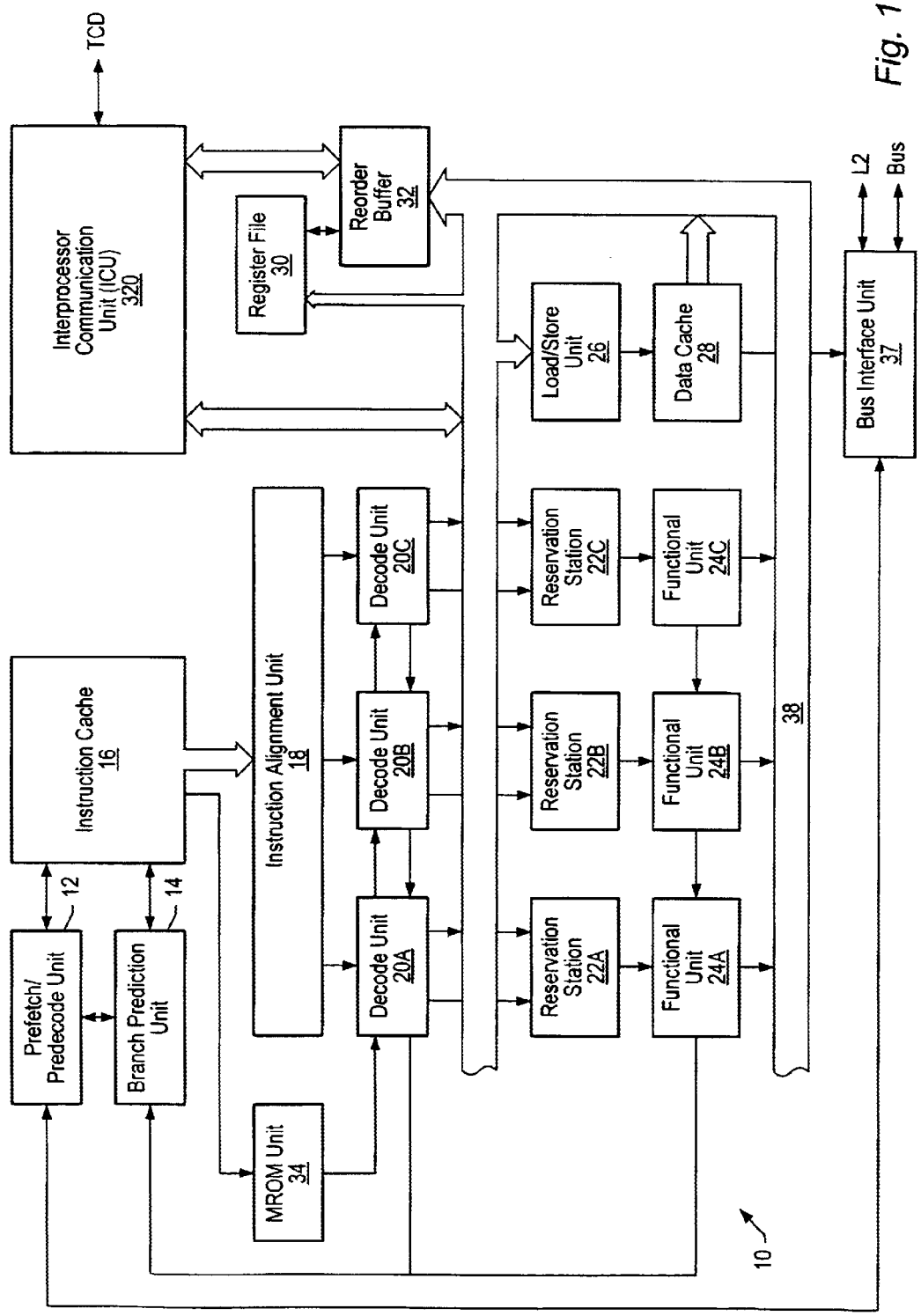
FIG. 1 is a block diagram of one embodiment of a microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Processor Overview

Turning now to FIG. 1, a block diagram of one embodiment of a processor 10 is shown. Other embodiments are possible and contemplated. As shown in FIG. 1, processor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, an interprocessor communication unit 300, and a bus interface unit 37. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from bus interface unit 37, and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to bus interface unit 37. Bus interface unit 37 is further coupled to an L2 interface to an L2 cache and a bus. Interprocessor communication unit 300 is coupled to reorder buffer 32 and result bus 38. Finally, MROM unit 34 is coupled to decode units 20.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 2 way set associative structure having 64 byte lines (a byte comprises 8 binary bits). Alternatively, any other desired configuration and size may be employed. For example, it is noted that instruction cache 16 may be implemented as a fully associative, set associative, or direct mapped configuration.

Instructions are stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14. Other embodiments may employ any suitable predecode scheme.

One encoding of the predecode tags for an embodiment of processor 10 employing a variable byte length instruction set will next be described. A variable byte length instruction set is an instruction set in which different instructions may occupy differing numbers of bytes. An exemplary variable byte length instruction set employed by one embodiment of processor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Processor 10 employs branch prediction in order to speculatively fetch instructions subsequent to conditional branch instructions. Branch prediction unit 14 is included to perform branch prediction operations. In one embodiment, branch prediction unit 14 employs a branch target buffer which caches up to two branch target addresses and corresponding taken/not taken predictions per 16 byte portion of a cache line in instruction cache 16. The branch target buffer may, for example, comprise 2048 entries or any other suitable number of entries. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of processor 10. In an alternative configuration, branch prediction unit 14 may be coupled to reorder buffer 32 instead of decode units 20 and functional units 24, and may receive branch misprediction information from reorder buffer 32. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction. In one particular embodiment, each instruction is decoded into up to two operations which may be separately executed by functional units 24A–24C.

Processor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to five pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. In one embodiment, reorder buffer 32 includes a future file which receives operand requests from decode units as well. Those of skill in the art will appreciate that the x86 register file includes eight 32 bit real registers (i.e., typically referred to as EAX, EBX, ECX, EDX, EBP, ESI, EDI and ESP). In embodiments of processor 10 which employ the x86 processor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are issued by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of processor 10, including using a future file to store the speculative state of register file 30.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case. In embodiments in which instructions may be decoded into multiple operations to be executed by functional units 24, the operations may be scheduled separately from each other.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 or reorder buffer 32 and subsequently communicating with reorder buffer 32 to complete the instructions. Additionally, functional units 24 may be configured to perform address generation for load and store memory operations performed by load/store unit 26. In one particular embodiment, each functional unit 24 may comprise an address generation unit for generating addresses and an execute unit for performing the remaining functions. The two units may operate independently upon different instructions or operations during a clock cycle.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32. It is further noted that branch execution results may be provided by functional units 24 to reorder buffer 32, which may indicate branch mispredictions to functional units 24.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a first load/store buffer having storage locations for data and address information for pending loads or stores which have not accessed data cache 28 and a second load/store buffer having storage locations for data and address information for loads and stores which have access data cache 28. For example, the first buffer may comprise 12 locations and the second buffer may comprise 32 locations. Decode units 20 arbitrate for access to the load/store unit 26. When the first buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between processor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 processor architecture.

Data cache 28 is a high speed cache memory provided to temporarily store data being transferred between load/store unit 26 and the main memory subsystem. In one embodiment, data cache 28 has a capacity of storing up to 64 kilobytes of data in an two way set associative structure. It is understood that data cache 28 may be implemented in a variety of specific memory configurations, including a set associative configuration, a fully associative configuration, a direct-mapped configuration, and any suitable size of any other configuration.

Interprocessor communication unit 300 provides an interface for communicating with another processor in a multithreaded multiprocessor configuration. In one embodiment, interprocessor communication unit 300 may include a reservation station for temporarily storing instructions to be executed. In addition, in one embodiment, interprocessor communication unit 300 interfaces to a thread control device which facilitates multithread related communications between processors.

In one particular embodiment of processor 10 employing the x86 processor architecture, instruction cache 16 and data cache 28 are linearly addressed and physically tagged. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. The physical address is compared to the physical tags to determine a hit/miss status.

Bus interface unit 37 is configured to communicate between processor 10 and other components in a computer system via a bus. For example, the bus may be compatible with the EV-6 bus developed by Digital Equipment Corporation. Alternatively, any suitable interconnect structure may be used including packet-based, unidirectional or bi-directional links etc. An optional L2 cache interface may be employed as well for interfacing to a level two cache.

Symmetric Multiprocessing

Figure 2:
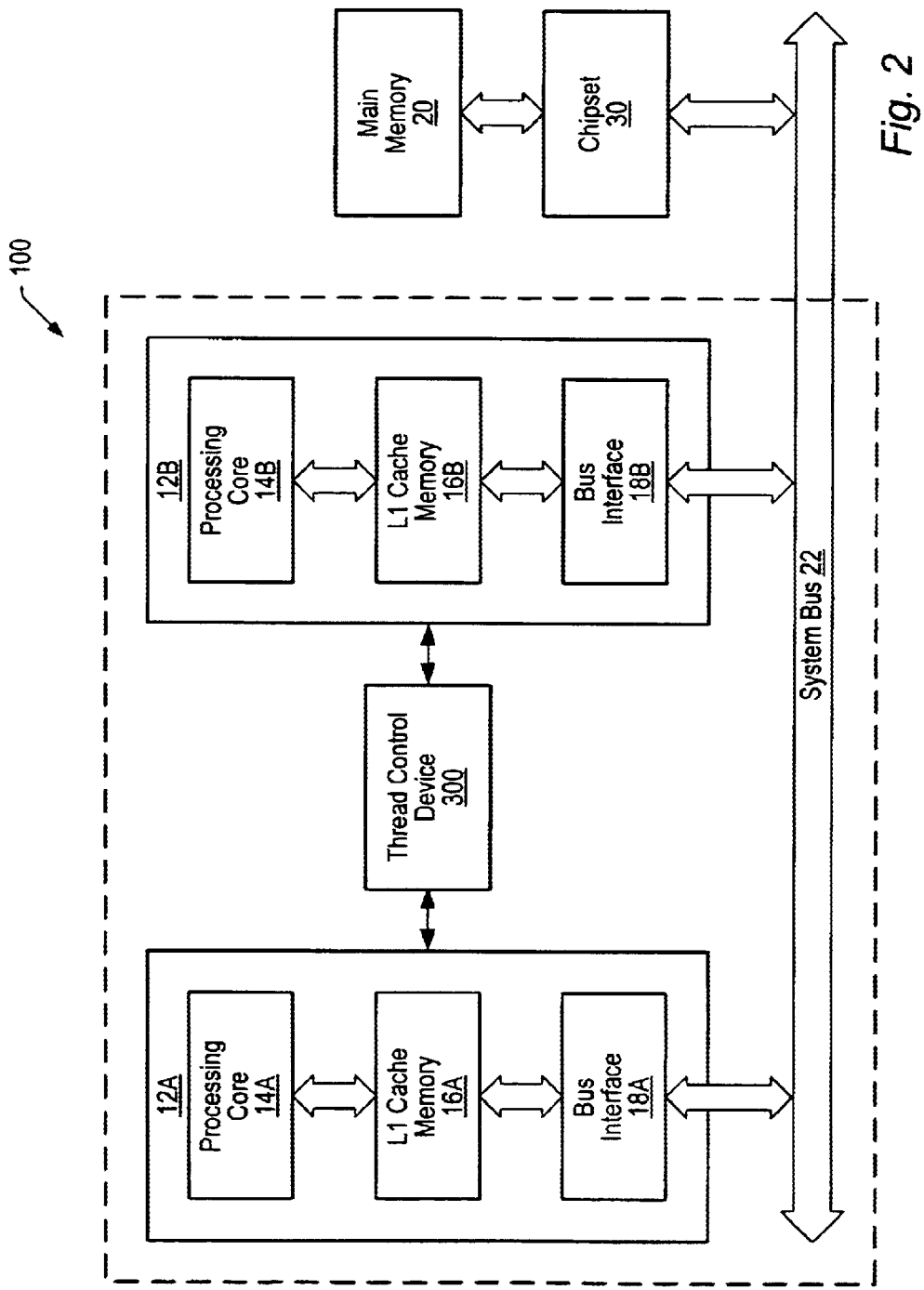
FIG. 2 is a block diagram of one embodiment of a multiprocessor computer.

FIG. 2 is a block diagram of one embodiment of a multiprocessor computer 100 including a plurality of processing units 12A–12B, a thread control device 300, a bus bridge 30 and a memory 20. Each processing unit 12A–12B includes a processing core 14A–14B, an L1 cache memory 16A–16B, and a bus interface 18A–18B, respectively. The processing units 12A–12B are coupled to a main memory 20 via a system bus 22.

The multiprocessor computer 100 of FIG. 2 is symmetrical in the sense that all processing units 12A–12B share the same memory space (i.e., main memory 20) and access the memory space using the same address mapping. The multiprocessing system 100 is further symmetrical in the sense that all processing units 12A–12B share equal access to the same I/O subsystem.

In general, a single copy of the operating system software as well as a single copy of each user application file is stored within main memory 20. Each processing unit 12A–12B executes from these single copies of the operating system and user application files. Although processing cores 14A–14B may be executing code simultaneously, it is noted that only one of the processing units 12A–12B may assume mastership of the system bus 22 at a given time. Thus, a bus arbitration mechanism, bus bridge 30, is provided to arbitrate concurrent bus requests of two or more processing units and to grant mastership to one of the processing units based on a predetermined arbitration algorithm. A variety of bus arbitration techniques are well-known.

The high speed cache memory 16A–16B of each processing unit 12A–12B, respectively, stores data most recently accessed by the respective processing unit along with address tags that indicate the main memory address to which the associated data corresponds. Since programs tend to execute the same sections of code and access the same data structures repeatedly, many of the locations accessed will already be stored in the cache if the cache is sufficiently large.

The cache mechanisms provide two significant benefits. First, because the caches are implemented with high-speed memory and can be accessed without bus arbitration and buffer delays, an access to a location stored in a respective cache is much faster than a main memory access. Second, because an access to a location stored in the respective cache does not require access to the system bus, the bus utilization of each processor is greatly reduced. The system bus is therefore available to service other requested transactions. Typically, the higher the "hit rate", the better the overall system performance. The hit rate is the percentage of accesses by a particular processing core that are to locations already stored in the cache. Well designed systems with moderately large caches can achieve hit rates of over ninety percent.

An important consideration with respect to multiprocessing systems that employ cache memories is data coherency. Since multiple copies of the data (and instructions) stored by main memory 20 may concurrently reside in one or more of the cache memories 16A–16B, a specialized mechanism must be employed to maintain the integrity of data in the event that one of the memory subsystems is updated (i.e., written with new data). For example, consider a situation wherein a particular section of data is updated within cache memory 16A by processing core 14A but is not updated within the corresponding section of main memory 20. If processing core 14B subsequently accesses the same section of code, there must be some reliable mechanism to track which section is up-to-date and which section is no longer valid to ensure that processing core 14B accesses the proper data. A variety of techniques have therefore been developed with the goal of efficiently maintaining cache coherency, including those based on so-called write-through and write-back techniques. Various cache coherency techniques are described within a host of publications of the known prior art, and are not discussed further herein.

Figure 3A:
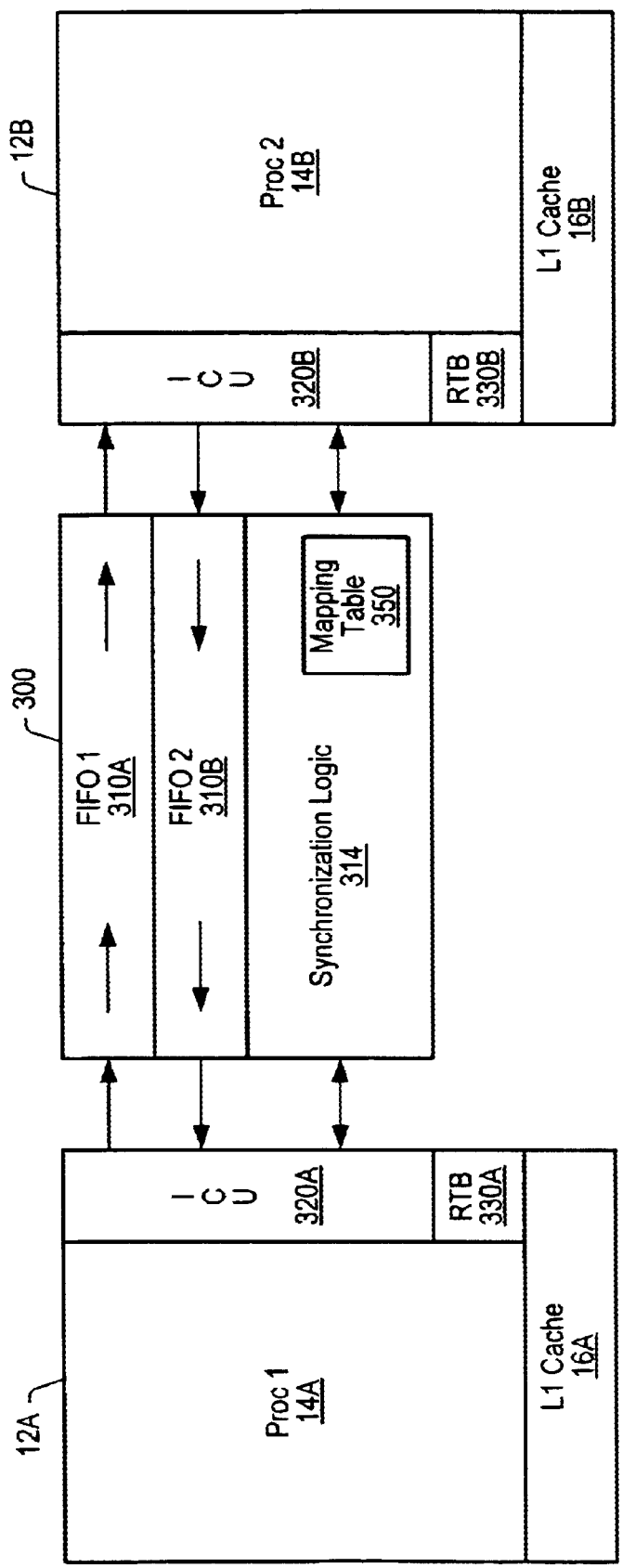
FIG. 3A is a diagram showing two microprocessors and a thread control device.
Figure 3B:
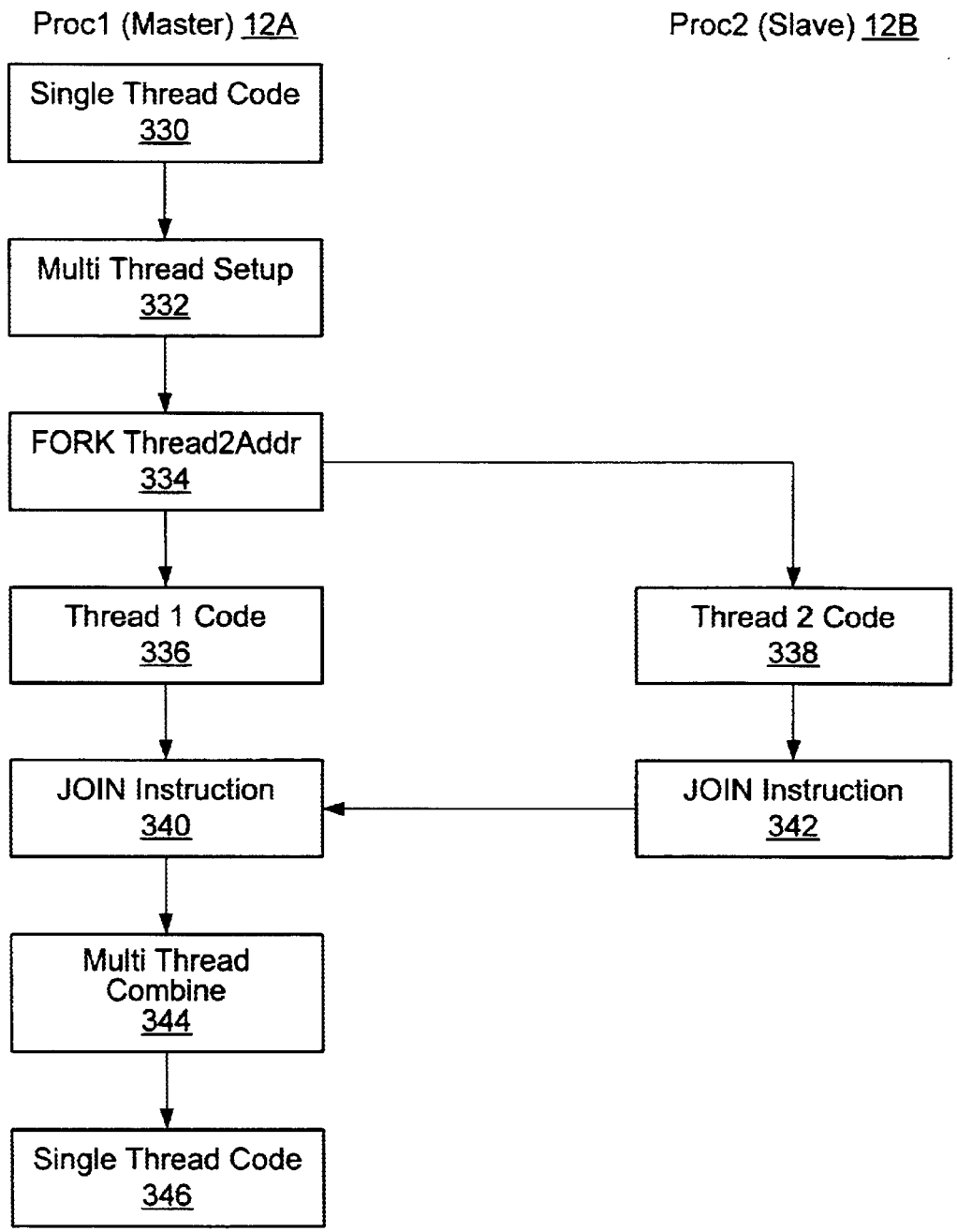
FIG. 3B is a flowchart illustrating thread setup, execution and completion.

General Operation FIGS. 3A and 3B illustrate the general operation of multithreaded multiprocessing. In FIG. 3A, interconnection between two processors 12A–12B and a thread control device 300 is shown. FIG. 3B is a flowchart illustrating the general operation of the multiprocessor computer shown in FIG. 3A. Each processor 12A–12B includes a processing core 14A–14B, an L1 cache 16A–16B, and an interprocessor communication unit (hereinafter ICU) 320A–320B. Also shown is thread control device 300 which includes first-in-first-out (hereinafter FIFO) buffers 310A–310B, synchronization logic 314, and mapping table 350.

The ICUs 320 of each processor 12 are coupled to thread control device 300 which facilitates communication between processors 12A and 12B. In general, one processor 12A serves as master and the other processor 12B serves as slave. The master processor 12A runs all single threaded code, sets up and starts thread execution on the slave processor 12B and consolidates execution results following thread execution. In general, processing core 14A executes single threaded code (block 330) until a multithread setup instruction is encountered. When processing core 12A encounters a multithread setup instruction (block 332), processing core 12A conveys thread setup instructions to ICU 320A which conveys them to FIFO 1 310A. ICU 320B retrieves instructions from FIFO 1 310A and transfers them to processing core 14B. Subsequently, master processor 12A conveys a thread 2 startup instruction (block 334) to ICU 320A which places the instruction into FIFO 1 310A. ICU 320B retrieves the thread startup instruction from FIFO 1 310A and transfers it to processing core 14B. Processing core 14B then begins fetching and executing the thread 2 code (block 338). Upon execution and retirement of a JOIN instruction (blocks 340 and 342) by both processors 12, slave processor 12B terminates execution of thread 2 and single threaded execution resumes with master processor 12A. Master processor 12A may then convey another instruction to processor 12B which causes slave processor 12B to convey thread 2 execution results to master processor 12A via FIFO 310B. Master processor 12A may then consolidate execution results from the separate threads (block 344) and continue normal execution (block 346). To summarize, master processor 12A sets up a second thread for execution on slave processor 12B. Both the master 12A and slave 12B processors execute threads in parallel. Master processor 12A then obtains the second thread execution results from the slave processor.

Detailed Description of Operation

Figure 4:
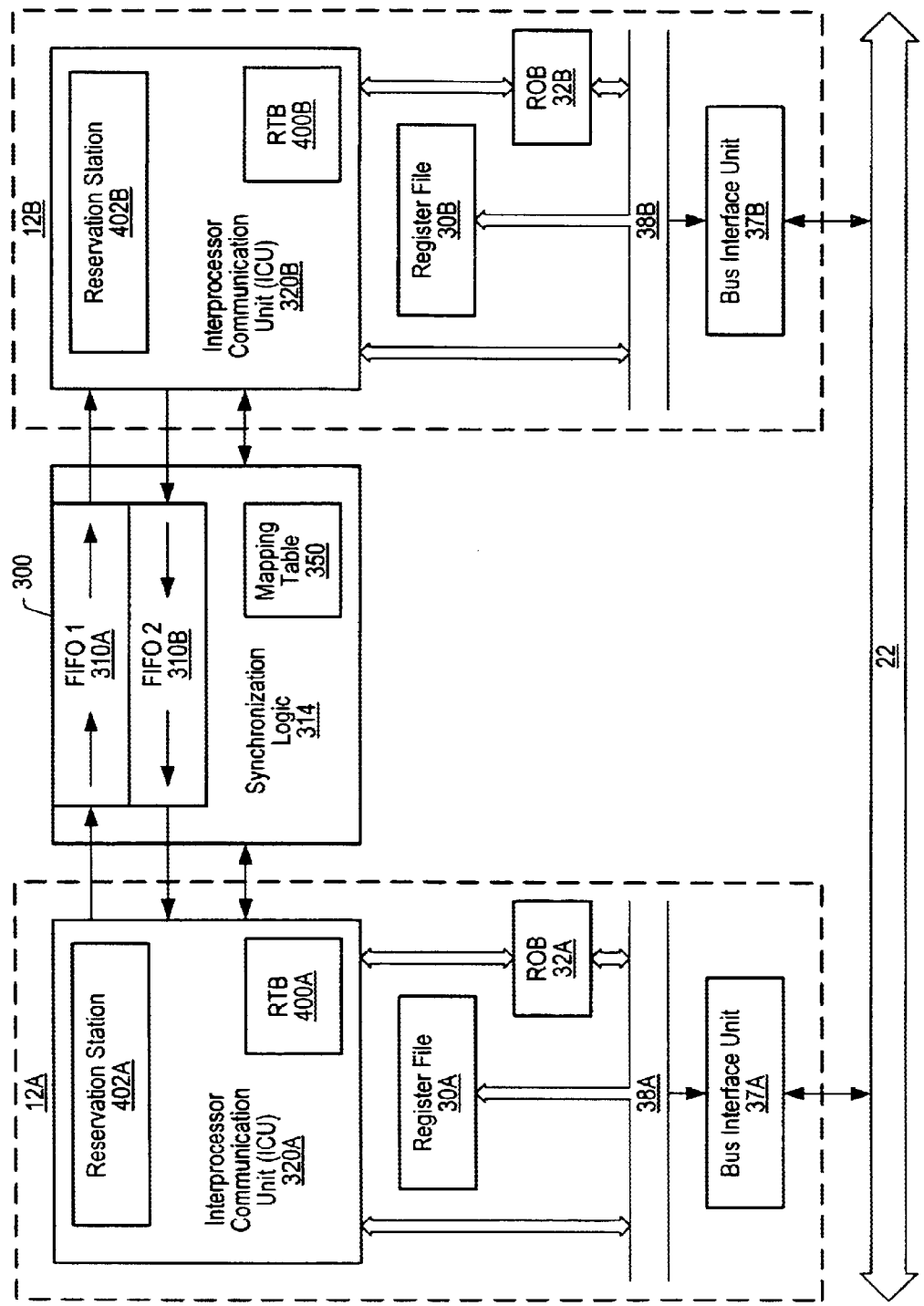
FIG. 4 is a diagram showing two microprocessors and a thread control device.

FIG. 4 shows one embodiment of a multithreaded multiprocessor. Included in FIG. 4 are portions of processors 12A and 12B, thread control device 300, and bus 22. Processors 12 include an ICU 320, register file 30, reorder buffer 32, system bus 38 and bus interface unit 37. In addition, ICU 320 includes a reservation station 402 and a reorder buffer tag translation buffer (hereinafter RTB) 400. Thread control device 300 includes two FIFOs 310, synchronization logic 314, and mapping table 350. Mapping table 350 may be used in conjunction with exception handling which will be discussed below. ICUs 320 are coupled to reorder buffer 32 and system bus 38. Register file 30 and bus interface unit 37 are coupled to bus 22. Bus interface unit 37 is also coupled to bus 22. Thread control device 300 is coupled to ICU 320.

In one embodiment of the multithreaded multiprocessor shown in FIG. 4, the five following instructions are used for the control of threads: Wr2Proc, RdFrProc, Fork, Join, Sync. Table 1 below gives a brief description of the purpose of each instruction.

TABLE 1

Thread Control Instructions

| Instruction | Syntax | Purpose |
| --- | --- | --- |
| Wr2Proc | Wr2Proc PNo, destreg, srcreg | To move data from the register file of the current processor to the register file of another processor. PNo = number of destination processor. destreg = register identifier on destination processor. srcreg = register identifier on current processor (source). |
| RdFrProc | RdFrProc PNo, destreg, srcreg | To move data from the register file of another processor to the register file of the current processor. PNo = number of destination processor. destreg = register identifier on current processor (destination). srcreg = register identifier on source processor. |
| Fork | PNo, ThrdAddr | Starts speculative execution of a thread on another processor. PNo = number of processor to start thread on. ThrdAddr = address of thread code. |
| Join | Join | End execution of thread code. |
| Sync | Sync | Serializes execution until all processors have reached the synchronization point. |

Briefly, master processor 12A sets up a second thread for execution by conveying Wr2Proc instructions to slave processor 12B. Wr2Proc instructions move data from the register file of the master processor to the slave processor. To start execution of the second thread, the Fork instruction is used. When the master processor 12A conveys a Fork instruction to slave processor 12B, slave processor 12B places the Fork instruction in its reorder buffer 32B and begins fetching the instructions for the second thread from the thread address conveyed with the Fork instruction. Execution of the second thread terminates upon execution of a Join instruction. The ability to speculatively execute thread instructions is important as is discussed below. Support for speculative execution is discussed next, followed by a more detailed discussion of the overall mechanism of thread setup and execution.

Support for Speculative Thread Execution

State of the art superscalar processors have large instruction windows. Consequently, to wait for a Fork instruction to retire before thread startup may result in significant delays. To allow optimal thread startup, the mechanism should allow for speculative startup of threads. This allows the second thread to startup and execute in the slave processor long before the Fork instruction retires in the master processor. vAdvantageously, performance of the multi-threaded multiprocessor is improved.

To support speculative thread execution, a reorder buffer tag translation buffer (RTB) 400 is included in each processor 12 which maps the location of an instruction in one processor reorder buffer to the location of the same instruction in another processor reorder buffer. In one embodiment, the RTB 400 has the same number of entries as the reorder buffer 32. The RTB is addressed with the reorder buffer 32 tag of a first processor and the addressed entry of the RTB 400 contains the corresponding reorder buffer tag 32 of the second processor.

To enable speculative startup and execution of threads, the Wr2Proc and Fork instructions are processed speculatively. When Wr2Proc and Fork are dispatched to the master processor ICU 320A, they are also sent to the slave processor 12B via FIFO 1 310A. Two possibilities may exist when the Wr2Proc instruction is dispatched to the master ICU 320A: data is available or data is not available. If data is available, the instruction, reorder buffer 32 A tag of the instruction, and an "add instruction" are sent to the slave processor. The instruction and data are inserted into the reorder buffer 32B of the slave processor and the entry is marked as having valid data. In addition, the RTB 400B of the slave is updated to indicate the correspondence between the reorder buffer 32A entry and the reorder buffer 32B entry. If data is not available upon dispatch to the master processor ICU 320A, the instructions remain in the ICU reservation station 402A of the master processor ICU 320A until data is available. However, the instruction is still sent to the slave processor 12B. The instructions are inserted into the reorder buffer 32B of the slave processor, the entries in the slave processor reorder buffer 32B are marked as not having valid data, and the RTB 400B is updated as described above. Instructions in slave processor reorder buffer 32B that are marked as not having valid data may not execute until data is available. When data becomes available for an instruction waiting in the reservation station 402A of the master processor 12A, the instruction is removed from the reservation station 402A of the master processor 12A and issues to ICU 320A. When the ICU 320A receives the instruction, the data and the reorder buffer 32A tag of the master processor, along with a "data update" command are sent to the slave processor 12B. The slave processor 12B translates the reorder buffer 32A tag using the RTB 400B to identify the tag of the instruction in the slave processor 12B reorder buffer 32B. The corresponding reorder buffer 32B tag is then used to insert the data into the correct reorder buffer 32B entry. The instruction in the slave processor reorder buffer 32B is now marked as having valid data and dependent instructions in slave processor 12B may issue.

Thread Setup and Thread Startup

To setup a second thread for execution on another processor, master processor 12A conveys speculative Wr2Proc instructions to slave processor 12B via FIFO 1 310A. In addition to the Wr2Proc instruction, master processor 12A conveys the reorder buffer 32A tag of the instruction to slave processor 12B. The instructions are placed into the reorder buffer 32B of the slave processor. If the data for the Wr2Proc instruction is available, it is placed in reorder buffer 32B as well. Otherwise, the reorder buffer 32B entry is marked as not having valid data. In parallel, the RTB 400B of the slave processor is updated by placing the tag of the slave processor reorder buffer 32B in the location indexed by the tag of the master processor reorder buffer 32A. If the reorder buffer 32B of the slave processor 12B is full, no instructions will be received from the master processor 12A. When space is available in slave processor reorder buffer 12B, master processor 12A receives an indication and pending instructions may be sent.

After setup of the second thread is complete, the Fork instruction is used to start execution of the second thread. When a Fork instruction is encountered by the master processor, it is sent to the slave processor 12B via thread control device 300 as described above. If the slave processor 12B is already running a thread, the Fork instruction is ignored. An indication is made by the slave processor 12B as to the success of the Fork operation. Such an indication may be made by various means, such as setting an ordinary processor flag which may be checked by the master processor 12A. Other embodiments may use other means to ensure an attempt to start a second thread is not made while another thread is already is running, eliminating the need for setting and checking of flags. If the slave processor 12B is not already running a thread, the Fork instruction is placed in reorder buffer 32B and the slave processor begins fetching instructions for the second thread. The newly fetched thread instructions are placed in reorder buffer 32B behind the Fork instruction and are dispatched to the processor functional units for execution. Those instructions which have no outstanding dependencies on the Wr2Proc instructions may issue. Advantageously, many nondependent instructions may issue in the slave processor 12B before the Fork instruction has retired in the master processor 12A. The mechanism of executing the thread instructions after the Fork instruction in the slave processor 12B is identical to a regular superscalar processor.

Branch Misprediction and Correction

When a branch misprediction is detected in the master processor 12A, all entries in the reorder buffer 32A following the branch are invalidated. If Wr2Proc or Fork instructions were mispredicted, these need to be invalidated in the slave processor 12B as well. When master processor 12A invalidates entries in reorder buffer 32A following a mispredicted branch, it detects the first Wr2Proc or Fork instruction following the mispredicted branch and sends the reorder buffer 32A tag of that instruction along with an invalidation request to the ICU 320A. This tag and request are then conveyed to the slave processor 12B where the master processor reorder buffer 32A tag is translated by the RTB 400B to obtain the reorder buffer 32B tag of the slave processor 12B. The resulting reorder buffer 32B tag is then used to invalidate that entry and all following entries in the reorder buffer 32B. If a Fork instruction is encountered during invalidation of instructions in reorder buffer 32B, speculative execution in slave processor 12B stops.

Ending Second Thread Execution and Retirement

The end of the second thread executing on the slave processor 12B is indicated by a Join instruction. A Join instruction is also used in the thread running on the master processor 12A. When both the master and slave processors 12 have retired the Join instruction, the slave processor 12B stops executing and execution continues only in the master processor 12A. When a slave processor 12B retires a Join instruction, it signals this retirement to the master processor 12A and its reorder buffer 32B is cleared. The slave processor 12B then stops execution and waits for the next Fork instruction. When the master processor 12A has received an indication that the slave processor 12B has retired the Join instruction, the master processor 12A marks its Join instruction as completed and ready to retire.

Once both processors 12 have retired the Join instruction, the master processor 12A may access the register file 30B of the slave processor 12B to obtain the execution results of the second thread. Access to the slave register file 30B is obtained by use of the RdFrProc instruction. The RdFrProc instruction is dispatched by the master processor 12A to the ICU 320A where it waits in the reservation station 402A until it is at the front and then it is issued. The RdFrProc command is then sent to the slave processor 12B. Execution of the RdFrProc command in the slave processor 12B reads the contents of the specified register and conveys the results back to the master processor 12A via FIFO 2 310B. The RdFrProc command in the master processor, which is still in the execute phase, retrieves the result and places it on the result bus 38A. Normal instruction execution then continues.

The RdFrProc instruction may issue before the Join instruction retires, but may not retire until after the Join instruction retires. Because synchronization is not performed prior to a RdFrProc instruction, a Join instruction must precede that instruction in both the master and slave threads. If a mispredicted branch occurs and RdFrProc instructions are mispredicted, the instruction may still receive the data but the result is discarded by the master processor reorder buffer 32A. Advantageously, the above mechanism enables speculative execution of the RdFrProc instruction.

Retiring Wr2Proc and Fork Instructions

When a Wr2Proc or Fork instruction retires in the master processor reorder buffer 32A, the reorder buffer 32A tag is sent to the slave processor where it is translated by RTB 400B to the reorder buffer 32B tag of the slave processor. Those instructions which have retired in the master processor 12A may then be retired from the slave processor 12B as well.

The retirement of Wr2Proc and Fork instructions may be handled in a variety of ways. One method involves a retirement command and the second involves a Fork commit command. In order to implement branch misprediction recovery as described above, the Wr2Proc and Fork command cannot retire in the slave processor reorder buffer 32B until they have retired in the master processor reorder buffer 32A. Consequently, reorder buffer 32A must notify reorder buffer 32B when such a retirement occurs. One way of making this notification is to send a retire command along with the reorder buffer 32A tag to the slave processor 12B whenever a Wr2Proc or Fork instruction retires in the master reorder buffer 32A. The master reorder buffer 32A tag is then translated by RTB 400B in the slave processor 12B to obtain the slave reorder buffer 32B tag. The resulting slave reorder buffer 32B tag is then used to retire the corresponding instruction. While this method creates additional retirement traffic to slave reorder buffer 32B, the operation of this method is advantageously transparent to software, unlike the following method.

A second method of handling the retirement of Wr2Proc and Fork instructions involves the use of a Fork commit command. When a Fork instruction is retired in the master reorder buffer 32A, the reorder buffer 32A indicates to the ICU 320A that a Fork instruction has been retired along with the corresponding reorder buffer 32A tag. The ICU 320A then sends a Fork commit command and the reorder buffer 32A tag to the slave processor 12B. The reorder buffer 32A tag is then translated by RTB 400B to obtain the corresponding reorder buffer 32B tag. The resulting reorder buffer 32B tag is then used to mark the corresponding entry as completed and ready to retire. Also, all previous Wr2Proc instructions in slave reorder buffer 32B are marked completed and can now retire. When using this second method, there is a special case to consider. If for some reason Wr2Proc instructions are not followed by a Fork instruction, they may not be marked as complete and may remain in the reorder buffer 32B. Subsequent thread setups by the master processor 12A may write more Wr2Proc instructions. With each setup, less space is available in the slave reorder buffer 32B. This process may continue and ultimately result in an overflow of the slave reorder buffer 32B. To avoid this condition, the software is required to keep track of the available size of the slave reorder buffer 32B. Even though this second method may produce less traffic than the first method described above, requiring the software to continuously track the available space in the slave reorder buffer 32B is undesirable. Consequently, the first method described above which utilizes a retirement command and is transparent to software is preferred.

In one embodiment, the ICU 320 may accept multiple instructions per cycle. Reservation station 402 may accommodate multiple instructions, with the position of the instructions within reservation station 402 indicating the order in which they are to be sent to the other processor. In addition, multiple instructions may be conveyed at once to the other processor. Overall, it must be ensured that the instructions are inserted in-order in the reorder buffer 32B of the other processor.

Synchronization of Threads
Synchronization Using Sync Instruction

There are times during execution of parallel threads when it may be desirable to get the threads into a determinable state. For example, if data must be exchanged between threads there needs to be a mechanism for synchronizing the execution of the threads. To enable synchronization, in one embodiment a Sync instruction and synchronization logic may be used. The synchronization mechanism used depends on the characteristics of the system. If all processors in the system have the same latencies and phases, then a highly synchronous implementation may be used. Otherwise a more flexible implementation may be used. In either case, the mechanism is transparent to the software. The same synchronization code may be used for either implementation.

FIG. 5 illustrates how a Sync instruction may be used to synchronize threads. FIG. 5 includes two columns, each representing a thread of instructions. The first column represents a thread of code running on a master processor and the second column represents a thread of code running on a slave processor. Each column in FIG. 5 is divided into rows with each cell representing a single instruction. Instruction 500 represents a label which may serve as a branch entry point from elsewhere in the code. The operation of the threads is as follows. Thread 1 code executes in parallel with thread 2 code. Thread 1 executes until it reaches the first Sync 502 instruction. Thread 2 code executes the mov instruction 510 which moves the Handle data to reg1. Thread 2 then continues execution to Sync instruction 512. When both threads have reached the first Sync instruction, 502 and 512 respectively, the Sync instructions may be retired. When both Sync instructions have exited the synchronization point (retired) execution continues. Thread 1 executes instruction 504 which reads the data from reg1 of processor 2 into reg0 of its register file. Both threads reach a second synchronization point at Sync instructions 506 and 514. When Sync instructions 506 and 514 are both ready to retire, both are retired and execution continues. Thread 1 then executes a compare instruction 507 and if they are not identical, the jump instruction 508 causes execution to continue with instruction 500. Otherwise, execution of thread 1 continues with other code. As the above example shows, a Sync instruction may not be retired until all processors are ready to retire their corresponding Sync instructions. This requires that each processor indicate when it is ready to retire a Sync instruction and each processor must know when all other processors have reached the synchronization point.

Figure 6:
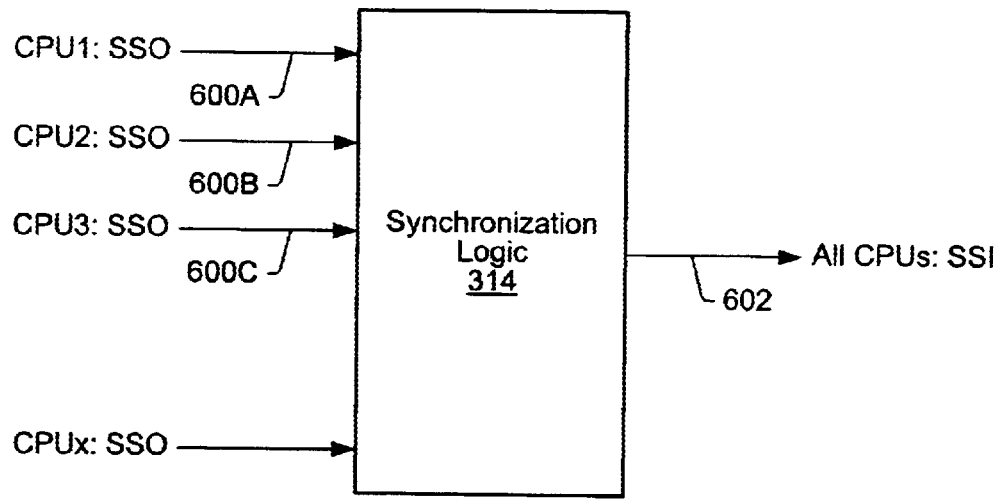
FIG. 6 shows a synchronous implementation of synchronization logic.

FIG. 6 shows a block diagram of a synchronous mechanism to implement the synchronization logic. Shown are synchronization logic 314, SSO signals 600, and SSI signal 602. SSO signals 600 are output from CPUs 1–x and input to synchronization logic 314. Synchronization logic 314 outputs signal SSI 602. In the synchronous implementation shown in FIG. 6, each processor is connected to synchronization logic 314 with 2 signals: a Sync State Out (SSO) signal 600 and a Sync Signal In (SSI) 602. Each processor outputs an SSO signal 600 to indicate the state of the Sync instructions to the synchronization logic 314. In addition, each processor receives SSI signal 602 as input to detect the status of the Sync instructions in other processors. In one embodiment, the state of the SSO signal 600 is described by the following table.

TABLE 2

| SSO state | State Description |
| --- | --- |
| 0 | No Sync instruction. |
| 1 | Sync instruction ready to retire. |

Sync instructions are handled specially by the reorder buffers. In the synchronous implementation, if a Sync instruction is next to retire, then the SSO signal 600 of that processor is set to state 1 to indicate to all other processors that it has entered the synchronization point. When all SSO signals 600 input to synchronization logic 314 are set to state 1, synchronization logic 314 sets the SSI signal 602 to state 1. Only when the SSI signal 602 input to a processor is set to state 1 may that processor retire its Sync instruction. In this manner, all processors retire their Sync instructions at the same time. When a processor retires a Sync instruction, its SSO signal 600 is set to state 0 on the following clock cycle to indicate it has exited the synchronization point. The second clock cycle following retirement, the SSO signal 600 may be set to state 1 again if a Sync instruction is ready to retire. In the synchronous implementation, synchronization logic 314 may consist of an AND gate, with all SSO signals 600 as inputs and the SSI signal 602 as output. The synchronous implementation provides the fastest synchronization mechanism. However, it can only be used if the processors operate in a cycle by cycle synchronous manner.

Figure 7:
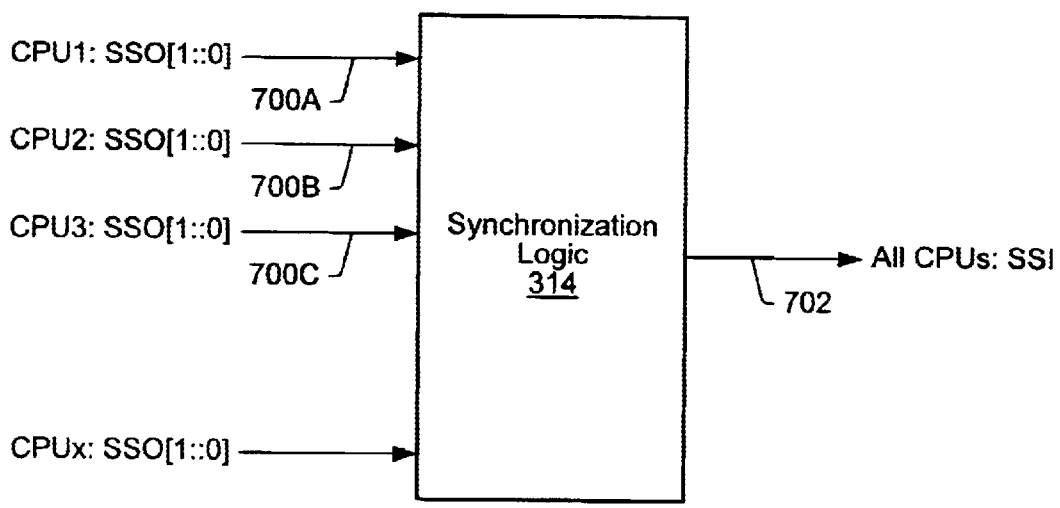
FIG. 7 shows an asynchronous implementation of synchronization logic.

If synchronous operation between the processors is not guaranteed, an asynchronous implementation of synchronization logic 314 may be used. FIG. 7 is a block diagram illustrating an asynchronous implementation. FIG. 7 shows synchronization logic 314, SSO signals 700 input to synchronization logic 314, and SSI signal 702 output from synchronization logic 314. In the asynchronous implementation, each processor includes a two bit SSO signal 700 to indicate the state of its Sync instruction. As in the synchronous implementation, synchronization logic 314 outputs an SSI signal 702 to each processor. In one embodiment, the state of the SSO signal 700 may be described by the following table.

TABLE 3

| SSO state | State Description |
|---|---|
| 0 | No Sync instruction. |
| 1 | Sync instruction ready to retire. |
| 2 | Sync instruction retired |

As in the synchronous implementation, Sync instructions are handled specially by the reorder buffers 32. In the asynchronous implementation, if a Sync instruction is next to retire, then the SSO signal of that processor is set to state 1 to indicate to the other processors that it is ready to retire its Sync instruction. When all SSO signals 700 input to synchronization logic 314 are set to state 1, synchronization logic 314 sets the SSI signal 702 to state 1. Only when the SSI signal 702 input to a processor is set to state 1 may that processor retire its Sync instruction. In this manner, all processors retire their Sync instructions at the same time. When a Sync instruction is retired, the SSO signal 700 of that processor is set to state 2 to indicate to the other processors that it is exiting the synchronization point. When a processor has exited the synchronization point and set its SSO signal 700 to state 2, it waits until all other processors have exited the synchronization point as well. When all processors have set their SSO signals 700 to state 2, SSI signal 702 is set to state 0. All processors may then detect that SSI signal 702 is set to state 0 and continue execution. After SSI signal 702 has returned to state 0, a processor may then indicate another Sync instruction is ready to retire by setting its SSI signal 700 to state 1.

The asynchronous implementation of the synchronization logic 314 may be central logic or may be included as part of one of the processors. The synchronization logic 314 implements a small state machine which may work as illustrated by FIG. 8. FIG. 8 represents a continuous loop wherein the state of FSMState is continuously checked. FSMState represents the state of the Sync signals SSO in the processors. Initially, synchronization logic 314 may be in state WAIT_ALL_S1. While in state WAIT_ALL_S1, signal SS1 is set to state 0. If all SSO signals are in state S1, indicating all processors are ready to retire a Sync instruction, then the next state for FSMState is ALL_S1. Otherwise, the next state for FSMState remains WAIT_ALL_S1. Once all SSO signals are in state S1, FSMState transitions to state ALL_S1 and subsequently to state WAIT_ALL_S2. In state WAIT_ALL_S2, the signal SS1 is set to state 1 which allows each processor to retire its Sync instruction. While in state WAIT_ALL_S2, synchronization logic waits for all SSO signals to enter state 2. Once all processors have exited the synchronization point, as indicated by setting their SSO signals to state 2, FSMState transitions to state ALL_S2 and subsequently to state WAIT_ALL_S1 where it sets signal SSI to state 0. This implementation allows the synchronization of processors even if they do not work in lock step. While this implementation is more flexible, it has a longer latency than the synchronous implementation described above.

Synchronization Using Scratchpad

Figure 9:
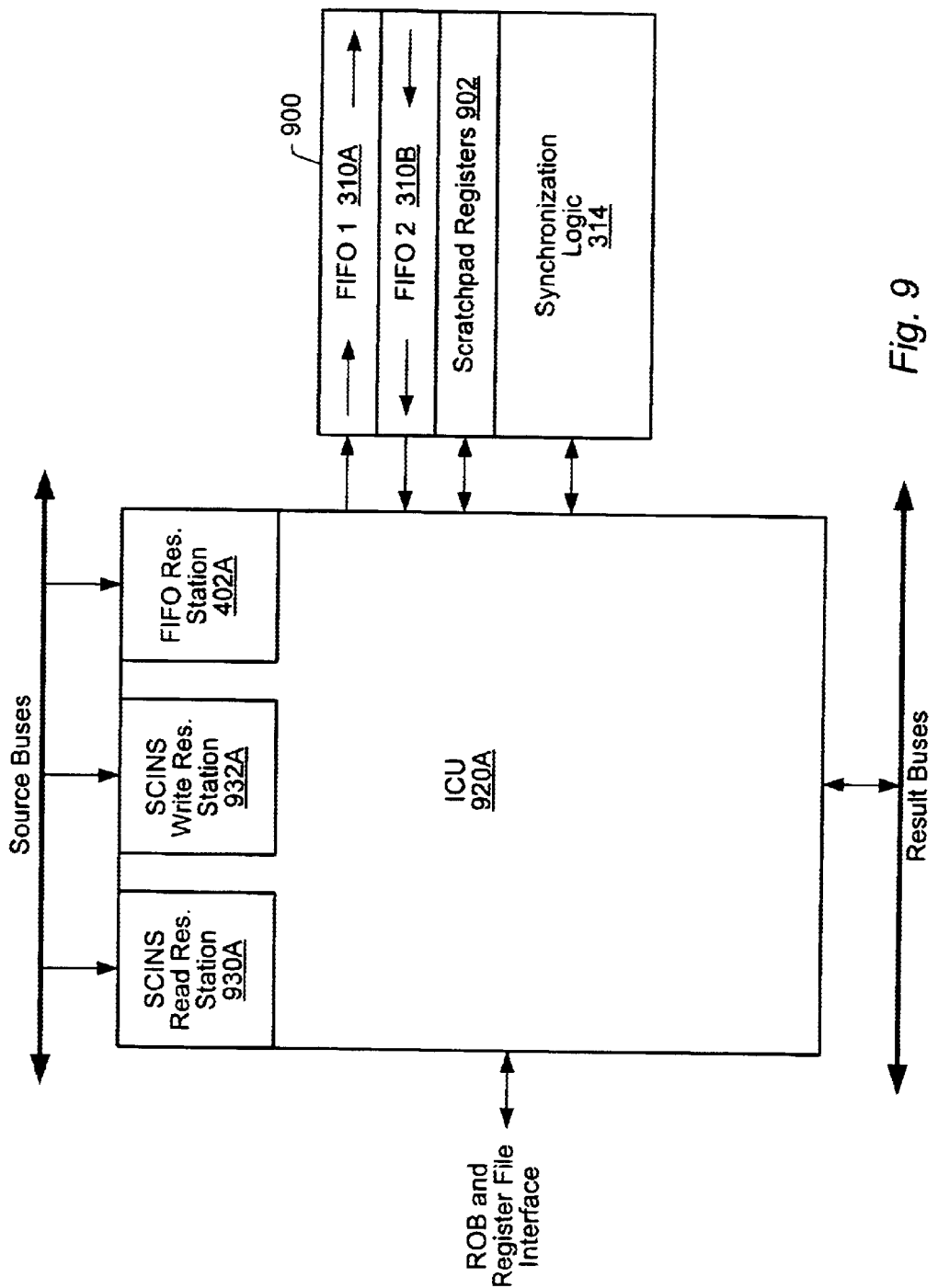
FIG. 9 shows one embodiment of an interprocessor communication unit and a thread control device.

Another way of exchanging data while multiple processors are processing different threads is to use a scratchpad register space. FIG. 9 shows a block diagram of an ICU 920A and TCD 900 using scratchpad registers 902 for synchronization. In addition to scratchpad registers 902, additional scratchpad instructions (hereafter SCINS) are added which access the scratchpad registers. To implement the scratchpad mechanism, scratchpad logic 902 has been added to the TCD. Shown in FIG. 9 are ICU 902A and TCD 900. ICU 902A includes SCINS Read reservation station 930A, SCFNS Write reservation station 932A, and FIFO reservation station 402A. TCD 900 includes FIFOs 310, synchronization logic 314, and scratchpad registers 902. ICU 902A is coupled to TCD 900.

The SCTNS are locked read-modify-write (hereafter RmodW) instructions to a scratchpad register location. These instructions enable the modification of shared data during parallel thread execution. The scratchpad register may be locked on an address by address basis. The SCINS are handled by a special functional unit which may be separate from, or included in, ICU 920. The SCINS functional unit includes separate reservation stations, 930 and 932, for read and write accesses. All instructions are issued in order from the scratchpad reservation stations. Any instruction which modifies a scratchpad location with a RmodW operation is a locked instruction. SCINS are decoded into multiple operations. At least a locked Read, ALU operation, and a locked Write are generated. The mechanism works as follows:

1. A locked RmodW SCINS is decoded. From this decoded instruction, a locked Read and locked Write are dispatched to the SCINS functional unit.
2. The locked Read is inserted into Locked Read reservation station 930A. The locked Write is inserted into Locked Write reservation station 932A.
3. When all previous reads in Read reservation station 930A have been completed, the locked Read is issued from Read reservation station 930A. Because all RmodW instructions are issued in order, the corresponding Write instruction is now also at the front of the Write reservation station 932A.
4. The Read now accesses scratchpad register 902. If it is locked, the Read waits until it is unlocked. Then it locks the scratchpad register 902 location, completes its operation and conveys the result to the result bus. However, the Read instruction is not yet removed from reservation station 930A.
5. All instructions dependent on the Read may now issue. Once the locked Write in Write reservation station 932A receives its input operand it is ready to issue. However, the Write does not issue until the Write is next to retire in the reorder buffer 32. This is required, because only non speculative writes are allowed.
6. When the Write is next to retire in the reorder buffer 32, the Write is issued from reservation station 932A and writes to scratchpad register 902. This write updates the data and unlocks the location. The SCINS Read and Write instructions are now removed from reservation stations 930 and 932, respectively.

In 6 above, the Read is removed from reservation station 930 if the associated Write retires. The Read must remain in the reservation station 930 in order to properly handle branch misprediction. In the case of a mispredicted branch, the mechanism operates as follows:

1. When a mispredicted branch is detected, the entries following the mispredicted branch in reorder buffer 32 are nullified.
2. During nullification, a SCINS locked instruction may be detected. This causes reorder buffer 32 to send the reorder buffer tags for the nullified SCINS to the SCINS functional unit together with an invalidate command. If multiple SCINS instructions are detected, then only the tags of the first instruction after the branch are required.
3. The SCINS functional unit uses the conveyed reorder buffer tag to invalidate all instructions in reservation stations 930 and 932 beginning with and following the received reorder buffer tag.
4. If the nullification of instructions in Read reservation station 930A hits a Read at the front of the reservation station 930A which has already been issued, the logic uses the address of the Read instruction to unlock that location in the scratchpad register 902.

The mechanism described above allows a speculatively locked scratchpad location 902 to be unlocked. Advantageously, the above mechanism allows the speculative execution of locked reads. While the above discussion uses separate Read and Write reservation stations, other implementations may be used and are contemplated. However, it must be possible to unlock a location if a locked Read was mispredicted without executing the mispredicted locked Write.

Exception and Interrupt Handling

Exceptions and interrupts may occur at any time during processing. In one embodiment, an exception may be defined as a synchronous event which occurs as the result of a predetermined condition being detected by the processor during execution of an instruction. On the other hand, an interrupt may be defined as an asynchronous event triggered by an I/O device requiring service. Examples of exceptions may be divide-by-zero and overflow conditions. An example of an interrupt may be an I/O request from a modem. In either case, when an exception or interrupt occurs, the processor typically halts execution of the current process, executes an exception/interrupt handling routine, then returns to the previously interrupted process.

Figure 10:
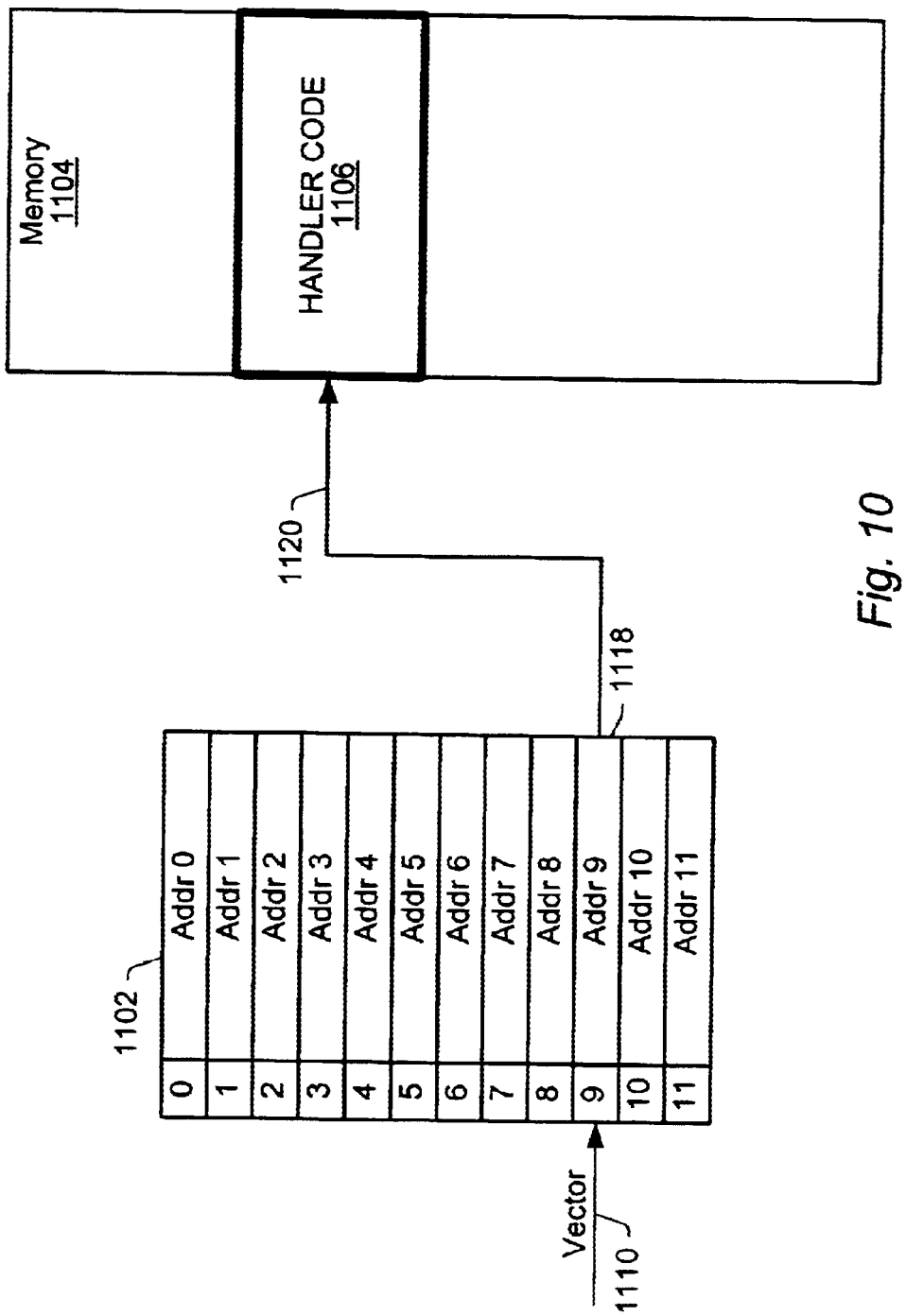
FIG. 10 is a diagram illustrating the use of a vector table.

Exceptions and interrupts may be identified by the processor by a number called a vector. This vector may then be used to index into a table which contains the address of a handling routine called a "handler". FIG. 10 shows a diagram of how a vector may be used to locate the appropriate handler. FIG. 10 includes vector 1110, vector table 1102 and memory segment 1104. Vector table includes addresses for 12 handlers, 0–11. Memory segment 1104 includes handler code 1106. Vector table 1102 may be located in main memory. Upon receiving an exception or interrupt, the processor utilizes the associated vector 1110 to index into vector table 1102. The entry 1118 in table 1102 corresponding to vector 1110 contains the address of the handler for the interrupt or exception. Arrow 1120 indicates the beginning address of handler code 1106 in memory segment 1104. Once identified, the processor executes handler code 1106 and returns to the previously interrupted process.

Because interrupted processes are returned to after executing an interrupt handler, the state of the interrupted process when it was interrupted must be saved and restored. Included in this saved state may be the status flags, registers and the current instruction pointer. Upon return from an interrupt, the saved flags, registers and instruction pointer are restored and execution resumes. Handling of interrupts generally involves the operating system of a computer which may provide for the allocation of state save space, recognition of certain interrupts and execution of handler code. In addition, because most modern operating systems are multitasking, a task switch may occur during an exception. A task switch is common in multitasking computer systems and may behave similar to an interrupt. Multitasking is the ability to run more than one program, or task, at the same time.

Multiprocessor Exceptions and Interrupts

In a multiprocessor as described above, exception handling may be somewhat more complicated than in the uniprocessor case. In order to minimize the need for modifications to the operating system, a mechanism is desired which hides the multiprocessor nature of the computer from the operating system. In one embodiment of a multiprocessor, the numbering of processors is static and specific threads are always assigned to the same physical processor. In addition, one of the processors, the master, may be responsible for handling all exceptions. In another embodiment, processor numbering is dynamic and exceptions may be handled by any processor. In this discussion, a two processor multiprocessor will be considered. However, multiprocessors with more than two processors are considered and the discussion may be generalized to include more than two processors. Further, software interrupts, including task switches, behave similarly and may be included in the following discussion as well.

Static Processor Numbering

FIG. 11 is a chart illustrating a sequence of events in a static numbered multiprocessor in which any processor may handle exceptions. In this example, incorrect operation results and illustrates the need for a new mechanism. Included in FIG. 11 are nine columns and seven rows, 0–6. Included in the columns are Time 1200, Event 1202, Current Processor 1204, Processor 1206, Process 1208, REG1 1220, EXT1 1222, REG2 1230 and EXT2 1232. Rows 0–6 correspond to a timeline in which row 0 is the earliest and row 6 is the latest. Event 1202 indicates an exception or interruption has occurred. Current processor 1204 indicates which of two processors in a multiprocessor computer, Proc1 or Proc2, is considered the current processor by the operating system. Processor 1206 indicates a particular processor. Process 1208 indicates the process which is executing on a particular processor. State Save Area 1250 includes both regular and extended save areas. REG1 1220 and EXT1 1222 show the contents of regular save area one and extended save area one, respectively. Finally, REG2 1230 and EXT2 1232 show the contents of regular save area two and extended save area two, respectively. Within the chart of FIG. 11, Thread1A and Thread1B correspond to Task1. Thread2A and Thead2B correspond to Task2.

At time 0, Proc1 is executing Thread1A and Proc2 is executing Thread1B. Proc1 is considered the current processor by the operating system. At time 1, the operating system switches from Task1 to Task2. The state of Proc1, the current processor, is saved as Thread1A State in REG1 1220 and the state of Proc2 is saved as Thread1B State in EXT1 1222. Both processors are then loaded with the state of Task2. At time 2, Proc1 is executing Thread2A and Proc2 is executing Thread2B. Proc1 is considered the current processor. At time 3, Proc2 detects an exception. Proc2 saves its state as the regular state, Thread2A State in REG2 1230 and Proc1 saves its state as extended state, Thread2B State in EXT2 1232. At time 4, Proc2 is executing the exception Handler and is considered the current processor. At time 5, the operating system switches back to Task1. Because Proc2 is now the current processor, it is loaded with the regular state, REG1 1220, and Proc1 is loaded with the extended state, EXT1 1222. Now, in time 6, Proc1 is executing Thread1B and Proc2 is executing Thread1A. Consequently, each processor is executing the thread that originated on the other. Because thread instructions may contain processor specific instructions (e.g., Wr2Proc2, xx, yy), incorrect results may be produced. To avoid this problem, the following mechanism is introduced. In the following mechanism, the regular state is always restored to Proc1. If it is determined that a state has been restored to a processor which is different than the one on which the state originated, the correct states are copied to the correct processors and processing continues.

Static Processor Numbering Master Handled—Master Exceptions

When an exception occurs in the master processor, handling is similar to the uniprocessor case. Upon detection of an exception by the master processor, the master (Proc1) notifies the slave processor (Proc2) that an exception condition has been detected. Both processors then reach a state from which they can restart, or "checkpoint" as it is commonly called. The "current" processor, Proc1, then saves its state (Thread1_State) to the regular state save area as in the uniprocessor case. The current processor may be the processor which generated the exception. Proc2 also saves its state information (Thread2_State) to a state save area. In addition, Proc1 saves additional control state information including an indication that it was Proc1 which generated the exception. The. control state information may include the state of additional exception handling circuitry. Both the Proc2 state and the additional Proc1 control state information may be saved to an "extended" state save area. This extended state save area may be required for state information which is beyond that which is ordinarily required in the uniprocessor case. After handling the exception, Proc1 restores the regular state save information (Thread1_State) to Proc1, the extended state save information (Thread2_State) to the other processor, Proc2, and the control information to the exception handling circuitry. Proc1 then checks the control information and detects that Proc1 originally generated the exception. Because the master processor, Proc1, generated the exception, each processor has received its original thread state and no further action is required. Proc1 and Proc2 then resume execution of their previously interrupted threads. As will be seen in the following discussion, further action is required when the slave generates the exception.

Static Processor Numbering Master Handled—Slave Exceptions

When a slave processor detects an exception, additional measures are required to ensure correct operation. Upon detection of an exception condition by the slave processor, the slave processor (Proc2) notifies the master processor (Proc1) that an exception condition has been detected. Both processors are then brought into a checkpoint state. Proc1 then saves its state (Thread1_State) to an extended state save area. Proc2 then copies its exception generating state (Thread2_State) to Proc1. In addition, control information is saved to the extended area which indicates that Proc2 generated the exception. Now Proc1 behaves as though it has generated the exception and appears as though it is the current processor. Proc1 saves its state (Thread2_State) to a regular state save area and continues with exception handling. Upon completion of exception handling, Proc1 reloads the regular save state (Thread2_State) to Proc1 and the extended save state (Thread1_State) to Proc2. Now Proc1 contains the Thread2_State and Proc2 contains the Thread1_State state. Because a thread may include processor specific instructions (e.g., Wr2Proc2, xx, yy), incorrect operation may result if each processor executes the original thread of the other. However, the additional control information indicates that Proc2 generated the exception. Consequently, Proc1 transfers its Thread2_State to Proc2 and Proc1 reloads its original Thread1_State from the extended state save area. Both processors now have their original thread states and may resume execution of their original threads.

Two possibilities for the storage of the extended state information include "transparent" and "non-transparent" state save. If transparent state save is used, the Proc2 state and additional Proc1 control state information are saved to an on chip buffer by the processor which detected the exception. By saving to an on chip buffer, the multiprocessor nature of the system and the extended state are hidden from the operating system. In non-transparent state save, the operating system provides for the extended state save. Whether using transparent or non-transparent state save, the operating system is only aware of a single processor. If non-transparent state save is used, the operating system treats the extended state save information as "extended" information of a single processor.

While the above mechanism hides the multiprocessor nature of the computer from the operating system when using a static processor numbering approach, additional overhead is required to handle the copying of states when a slave processor generates an exception. This is due the fact that the regular state is always restored to Proc1, but a particular thread must always run on the same physical processor. To eliminate this overhead, a dynamic processor numbering mechanism is proposed.

Dynamic Processor Numbering

In the static processor numbering mechanism described above, a single processor handles all exceptions. However, because the static numbering scheme requires specific threads always be assigned to the same physical processor, additional overhead is created. If any processor were enabled to process exceptions, some overhead inherent in the static scheme may be avoided. However, a static numbering scheme may introduce problems if any processor is allowed to process exceptions as is illustrated in the discussion of FIG. 11.

Figure 12:
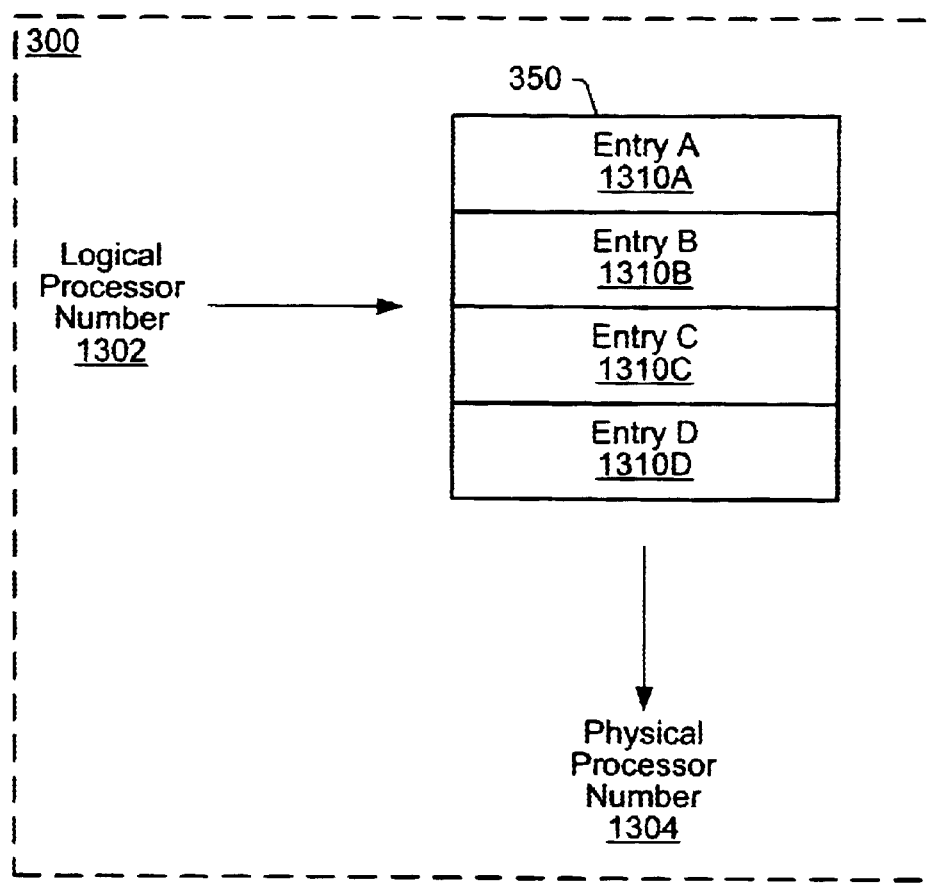
FIG. 12 is a block diagram showing a mapping table which may be included in the multiprocessor of FIG. 2.

In the dynamic processor numbering approach, the assignment of processor numbers to a physical processor is done using a mapping table. The mapping table may be a central unit. The mapping table is addressed with a logical processor number contained in an instruction and the corresponding entry contains a physical processor number. FIG. 12 is a block diagram showing one embodiment of a mapping table. Included in FIG. 12 are thread control device 300 and mapping table unit 350. Mapping table unit 350 may be within thread control device 300 or may be a completely separate unit. In the embodiment of FIG. 12, mapping table unit 350 includes four entries 1310, each of which may contain a physical processor number. In general, the mapping table may have a number of entries equal to the number of processors in the multiprocessor computer. When indexed with a logical processor number 1302, mapping table unit 350 conveys the entry 1304 which corresponds to the index 1302. Logical processor number 1302 corresponds to the processor number contained within a thread instruction (e.g., RdFrProc2, yy, xx). Operation of mapping table unit 350 within a multiprocessor computer may be described as follows.

Briefly, when a processor generates an exception, its own state is saved as the regular state and the other processor's state is saved as the extended state. The entry in mapping table 350 corresponding to the Proc1 index 1302 is set to indicate the number of the processor which generated the exception. The processor which generated the exception then handles the exception. Upon return from exception handling, the regular state is restored to Proc1. Now, rather than copying states from one processor to another as in the static method described above, the mapping table is remapped to reflect any changes in thread state positions. The contents of GenExcProc (the processor which generated the exception) is entered into mapping table 350 at the entry corresponding to index Proc1 and the remaining entries in mapping table 350 are numbered in sequence with the remaining processor numbers. Now when a multiprocessor instruction is executed which contains a processor number, the table is used to map the processor number in the instruction to a physical processor number. For example, when executing the instruction Wr2Proc2, xx, yy, the processor number used in the instruction "2" is used as an index into the mapping table. The entry in the mapping table corresponding to the index is then used as the actual physical processor to which the instruction is addressed.

Figure 13:
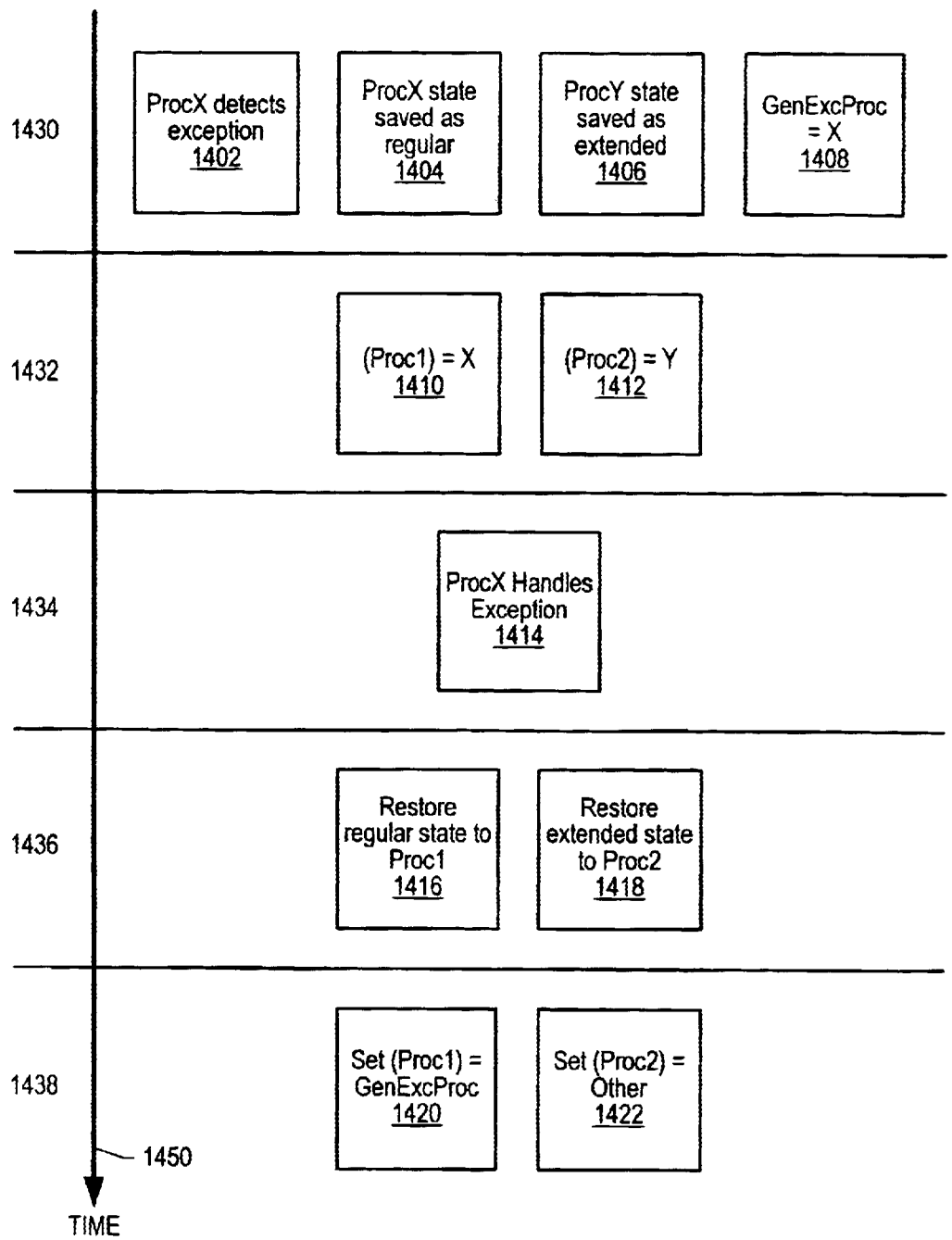
FIG. 13 is a chart illustrating events in a dynamic numbering scheme.

FIG. 13 illustrates a more detailed example of the operation of dynamic processor numbering using mapping table 350. FIG. 13 represents a sequence of actions and events along a timeline 1450. Timeline 1450 is divided into five broad time periods 1430, 1432, 1434, 1436 and 1438 from the earliest in time 1430 to the latest in time 1438. Within each section 1430–1438 are actions and events which may take place during that time period. The time periods shown and specific sequences are not intended to be exclusive, but are only intended to illustrate general operation. Other combinations and permutations of actions, events and sequences are contemplated as well.

As shown in FIG. 13, during time period 1430, ProcX detects an exception 1402. In this example, the "X" in ProcX represents the physical processor number. Subsequent to detecting the exception 1402, the ProcX state is saved as the regular state 1404, ProcY state is saved as extended state 1406, and GenExcProc is set equal to X 1408. GenExcProc will typically be saved as part of the extended state as well. During time period 1432, mapping table 350 is modified. The mapping table entry corresponding to index Proc1 is set to X 1410 (the number of the exception generating processor) and the entry corresponding to index Proc2 is set to the physical number of the other processor in the computer, Y 1412. Then during time period 1434, ProcX handles the exception. Upon completion of exception handling, the regular state is restored to Proc1 1416 and the extended state is restored to Proc2 1418. Finally, during time period 1438 mapping table 350 is modified to reflect the contents of GenExcProc. The contents of the entry in the mapping table 350 pointed to by Proc1 are set to the value of GenExcProc 1420. Also, the contents of the entry in the mapping table 350 pointed to by Proc2 are set to the physical number of the other processor in a two processor computer. In a computer with more than two processors, the other processor states are saved as extended state and restored in the sequence in which they were saved. The final result is a state originating on a particular processor may be restored to a different processor. To handle the processor specific instructions which may be contained within a thread, the mapping table is used to map processor references to actual physical processors.

Using the dynamic numbering mechanism described above, the multiprocessor nature of the computer remains hidden from the operating system, any processor may handle an exception, and the correct process states are restored to the correct processors. In addition, the overhead of copying states between processors which is required in the static numbering mechanism is avoided. Advantageously, performance may be improved.

FIG. 14 is a chart similar to the chart of FIG. 11. However, FIG. 14 illustrates a sequence of events in a dynamic numbered multiprocessor which result in correct operation. In addition to the features of FIG. 11, FIG. 14 includes columns GenExcProc 1234, Proc1 1236, and Proc2 1238. GenExcProc 1234 represents the processor which detected an interrupt or exception and is generally saved as part of the extended state. Proc1 1236 and Proc2 1238 represent entries in a mapping table 1502. Proc1 1236 represents those entries indexed by Proc1 and Proc2 1238 represents those entries indexed by Proc2. While the chart in FIG. 14 illustrates operation for a two processor multiprocessor, the mapping table mechanism may be extended to multiprocessors with more than two processors.

At time 0 in FIG. 14, Task1 is executing with Proc1 executing Thread1A and Proc2 executing Thread1B. Proc2 is considered the current processor by the operating system. At time 1, the operating system switches Task1 to Task2. The state of Proc2, the current processor, is saved as Thread1B State in REG1 1220 and the state of Proc1 is saved as Thread1A State in EXT1 1222. In addition, GenExcProc 1234 is set to the number of the interruption detecting processor at the time of the task switch, 2, and is saved as part of the Task 1 extended state. Also, the mapping table 1502 entry indexed by Proc1 1236 receives the number of the current processor, 2, and Proc2 receives the number of the other processor, 1. Both processors are then loaded with the state of Task2 Proc1 receives the Task2 regular state and Proc2 receives the Task2 extended state. Task2 extended state also includes GenExcProc (not shown) which is equal to 1. Consequently, Proc1 1236 is set to 1 and Proc2 1238 is set to 2. At time 2, Proc1 is executing Thread2A and Proc2 is executing Thread2B. Proc2 is considered the current processor. At time 3, Proc2 detects an exception. Proc2 (which detected the exception) saves its state as Thread2B State in REG2 1230 and Proc1 saves its state as Thread2A State in EXT2 1232. The associated GenExcProc 1234 is set to 2 (the physical number of the exception detecting processor). Mapping table 1502 Proc1 entry 1236 is also set to GenExcProc, 2, and the entry for Proc2 1238 is set to 1. At time 4, Proc2 is executing the exception Handler and is considered the current processor. At time 5, the operating system switches back to Task1. Not shown in FIG. 14 is an additional save state area for the task switch at time 5. However, the operation of state save is as described as above. At time 5, GenExcProc 1234 and Proc1 1236 are set to the current processor, 2, and Proc2 1238 is set to 1. Proc1 receives the regular save state 1220 of Task1 and Proc2 receives the extended save state of Task1. Also, Proc1 1236 in mapping table 1502 is set to the GenExcProc associated with Task 1, 2. Proc2 1238 is set to 1. Now, in time 6, Proc1 is executing Thread1B and Proc2 is executing Thread1A. Consequently, each processor is now executing the thread that originated on the other. However, the mapping table 1502 has been modified such that processor specific instructions will be mapped correctly and correct operation may be maintained. Advantageously, no copying of states between processors is required.

When using the dynamic mechanism described above, multithread instructions which reference a processor are remapped using the mapping table described herein. If a multiprocessor with more than two processors is used, the mechanism described above may be generalized to accommodate the added processors by using a mapping table with a corresponding increase in number of entries. When an exception or interruption is detected and a state save is performed, the current or detecting processor state is saved as the regular state as before. Other processor states are then saved in order of processor number. Likewise, the current or detecting processor number is entered into the mapping table entry indexed by Proc1 as before and other processor numbers are entered in order beginning with the entry indexed by Proc2. Finally, restoration of states utilizes the mapping table to determine which processor receives the regular state as described above and other states are restored from the extended save state space to processors in order of their number.

Computer System

Figure 15:
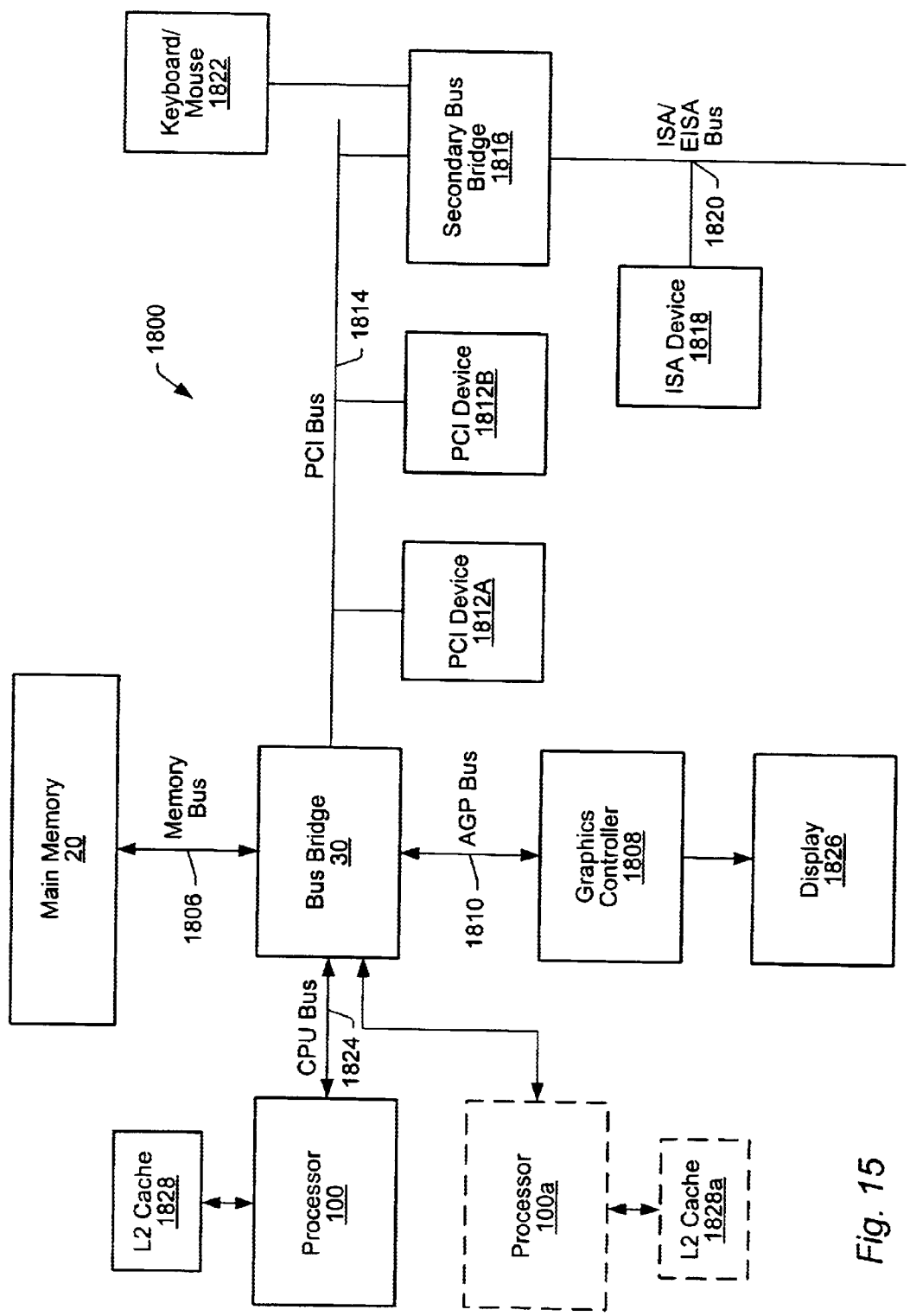
FIG. 15 is a block diagram of one embodiment of a computer system including the multiprocessor computer shown in FIG. 2.

Turning now to FIG. 15, a block diagram of one embodiment of a computer system 1800 including multiprocessor computer 100 coupled to a variety of system components through a bus bridge 1802 is shown. Other embodiments are possible and contemplated. In the depicted system, a main memory 1804 is coupled to bus bridge 1802 through a memory bus 1806, and a graphics controller 1808 is coupled to bus bridge 1802 through an AGP bus 1810. Finally, a plurality of PCI devices 1812A–1812B are coupled to bus bridge 1802 through a PCI bus 1814. A secondary bus bridge 1816 may further be provided to accommodate an electrical interface to one or more EISA or ISA devices 1818 through an EISA/ISA bus 1820. Multiprocessor computer 100 is coupled to bus bridge 1802 through a CPU bus 1824 and to an optional L2 cache 1828.

Bus bridge 1802 provides an interface between multiprocessor computer 100, main memory 1804, graphics controller 1808, and devices attached to PCI bus 1814. When an operation is received from one of the devices connected to bus bridge 1802, bus bridge 1802 identifies the target of the operation (e.g. a particular device or, in the case of PCI bus 1814, that the target is on PCI bus 1814). Bus bridge 1802 routes the operation to the targeted device. Bus bridge 1802 generally translates an operation from the protocol used by the source device or bus to the protocol used by the target device or bus.

In addition to providing an interface to an ISA/EISA bus for PCI bus 1814, secondary bus bridge 1816 may further incorporate additional functionality, as desired. An input/output controller (not shown), either external from or integrated with secondary bus bridge 1816, may also be included within computer system 1800 to provide operational support for a keyboard and mouse 1822 and for various serial and parallel ports, as desired. An external cache unit (not shown) may further be coupled to CPU bus 1824 between multiprocessor computer 100 and bus bridge 1802 in other embodiments. Alternatively, the external cache may be coupled to bus bridge 1802 and cache control logic for the external cache may be integrated into bus bridge 1802. L2 cache 1828 is further shown in a backside configuration to processor 10. It is noted that L2 cache 1828 may be separate from multiprocessor computer 100, integrated into a cartridge (e.g. slot 1 or slot A) with multiprocessor computer 100, or even integrated onto a semiconductor substrate with multiprocessor computer 100.

Main memory 1804 is a memory in which application programs are stored and from which multiprocessor computer 100 primarily executes. A suitable main memory 1804 comprises DRAM (Dynamic Random Access Memory). For example, a plurality of banks of SDRAM (Synchronous DRAM) or Rambus DRAM (RDRAM) may be suitable.

PCI devices 1812A–1812B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 1818 is illustrative of various types of peripheral devices, such as a modem, a sound card, and a variety of data acquisition cards such as GPIB or field bus interface cards.

Graphics controller 1808 is provided to control the rendering of text and images on a display 1826. Graphics controller 1808 may embody a typical graphics accelerator generally known in the art to render three-dimensional data structures which can be effectively shifted into and from main memory 1804. Graphics controller 1808 may therefore be a master of AGP bus 1810 in that it can request and receive access to a target interface within bus bridge 1802 to thereby obtain access to main memory 1804. A dedicated graphics bus accommodates rapid retrieval of data from main memory 1804. For certain operations, graphics controller 1808 may further be configured to generate PCI protocol transactions on AGP bus 1810. The AGP interface of bus bridge 1802 may thus include functionality to support both AGP protocol transactions as well as PCI protocol target and initiator transactions. Display 1826 is any electronic display upon which an image or text can be presented. A suitable display 1826 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 1800 may be a multiprocessing computer system including additional multiprocessor computers (e.g. multiprocessor computer 10a shown as an optional component of computer system 1800). Multiprocessor computer 10a may be similar to multiprocessor computer 10. More particularly, multiprocessor computer 10a may be an identical copy of multiprocessor computer 10. Multiprocessor computer 10a may be connected to bus bridge 1802 via an independent bus (as shown in FIG. 5) or may share CPU bus 1824 with processor 10. Furthermore, processor 10a may be coupled to an optional L2 cache 1828a similar to L2 cache 1828.

It is noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Numerous variations and modifications will become apparent to those skilled in the art once the above disclosure is fully appreciated. It is intended that the following claims be interpreted to embrace all such variations and modifications.

What is claimed is:

1. A method of performing exception handling in a multiprocessor computer including a master processor and a slave processor, said method comprising:

detecting an exception in said slave processor and providing notification to said master processor of said detected exception;

saving a first state of said master processor as an extended state in response to said notification;

copying a second state of said slave processor to said master processor;

said master processor saving said second state as a regular state of said master processor;

saving control information, wherein said control information includes an indication of which processor detected said exception;

said master processor handling said exception;

restoring said regular state to said master processor;

restoring said first extended state to said slave processor; and transferring said regular state from said master processor to said slave processor and loading said extended state to said master processor, in response to detecting said control information indicates said slave processor detected said exception.

2. The method of claim 1, wherein said extended state is saved to an on chip buffer.

3. The method of claim 1, wherein said extended state is saved to system memory.

4. A method of performing exception handling in a multiprocessor computer comprising:

executing a first thread on a first processor and a second thread on a second processor;

detecting an exception in said first processor;

saving a first state of said first processor as a regular state and a second state of said second processor as an extended state;

storing control information which indicates that said first processor detected said exception;

mapping an identification of said first processor to a first index and mapping an identification of said second processor to a second index;

handling said exception;

loading said regular state to a processor which is mapped to said first index and loading said extended state to a processor which is mapped to said second index, wherein said second processor is mapped to said first index and said first processor is mapped to said second index;

mapping said first index to a processor which the control information indicates detected the exception and mapping the second index to a processor which did not generate the exception; and executing said first thread on said second processor and said second thread on said first processor.

5. The method of claim 4, further comprising:

utilizing a mapping table to perform said mapping, wherein said mapping table is configured to map logical processor numbers to physical processor numbers;

executing an instruction which include a reference to a logical processor number; and indexing into said table using said logical processor number to identify the corresponding physical processor number.

6. The method of claim 5, wherein said first extended state and said second extended state are saved to an on chip buffer.

7. The method of claim 5, wherein said first extended state and said second extended state are saved to system memory.

8. A multiprocessor computer comprising:

a slave processor configured to:
     detect an exception; and
     save control information, wherein said control information includes an indication of which processor detected said exception;

a master processor configured to:
     receive notification of said detected exception from said slave processor; and
     save a first state of said master processor as an extended state in response to said notification;
     receive a copy of a second state of said slave processor;
     save said second state as a regular state of said master processor; and
     handle said exception;

circuitry configured to:
     restore said regular state to said master processor;
     restore said extended state to said slave processor; and
     transfer said regular state from said master processor to said slave processor and loading said first extended state to said master processor, in response to detecting said control information indicates said slave processor detected said exception.

9. A multiprocessor computer comprising:

a first processor configured to:
     execute a first thread;
     detect an exception;
     save a first state of said first processor as a regular state in response to said exception;
     store control information which indicates that said first processor detected said exception;
     handle said exception;

a second processor configured to:
     execute a second thread;
     receive notification from said first processor of said detected exception; and
     save a second state of said second processor as an extended state;

circuitry configured to:
     map an identification of said first processor to a first index and map an identification of said second processor to a second index;
     load said stored regular state to a processor which is mapped to said first index and load said stored extended state to a processor which is mapped to said second index, wherein said second processor is mapped to said first index and said first processor is mapped to said second index, and wherein said first thread is executed on said second processor and said second thread is executed on said first processor; and
     map said first index to a processor which the stored control information indicates detected the exception and map the second index to a processor which did not generate the exception.

10. The multiprocessor computer of claim 9, wherein said circuitry includes a mapping table configured to map logical processor numbers to physical processor numbers, and wherein said first processor is configured to:
- execute an instruction which include a reference to a logical processor number; and
- index into said table using said logical processor number to identify the corresponding physical processor number.

11. The multiprocessor computer of claim 8, wherein said first extended state and said second extended state are saved to an on chip buffer.

12. The multiprocessor computer of claim 8, wherein said first extended state and said second extended state are saved to system memory.

13. The multiprocessor computer of claim 9, wherein said first extended state and said second extended state are saved to an on chip buffer.

14. The multiprocessor computer of claim 9, wherein said first extended state and said second extended state are saved to system memory.

* * * * *